(12) United States Patent
Dorini et al.

(10) Patent No.: US 12,447,679 B2
(45) Date of Patent: Oct. 21, 2025

(54) METHOD OF OPERATION FOR AN APPARATUS FOR LAYER-BY-LAYER MANUFACTURE OF 3D OBJECTS

(71) Applicant: Stratasys Powder Production Ltd., London (GB)

(72) Inventors: Gianluca Dorini, London (GB); Christoffer Raad Petersen, London (GB); Torben Lange, London (GB); Anders Hartmann, London (GB); David Armand, London (GB); Kristian Noergaard, London (GB)

(73) Assignee: Stratasys Powder Production Ltd., London (GB)

(*) Notice: Subject to any disclaimer, the term of this patent is extended or adjusted under 35 U.S.C. 154(b) by 197 days.

(21) Appl. No.: 18/484,693

(22) Filed: Oct. 11, 2023

(65) Prior Publication Data

US 2024/0123686 A1 Apr. 18, 2024

(30) Foreign Application Priority Data

Oct. 13, 2022 (GB) ...................................... 2215121

(51) Int. Cl.
  *B29C 64/295* (2017.01)
  *B29C 64/153* (2017.01)
  (Continued)

(52) U.S. Cl.
  CPC .......... *B29C 64/295* (2017.08); *B29C 64/153* (2017.08); *B29C 64/343* (2017.08);
  (Continued)

(58) Field of Classification Search
  CPC ... B29C 64/295; B29C 64/153; B29C 64/343; B29C 64/386; B33Y 10/00; B33Y 50/00; B22F 10/73; B22F 12/13
  See application file for complete search history.

(56) References Cited

U.S. PATENT DOCUMENTS

2014/0314613 A1* 10/2014 Hopkinson ............ B33Y 30/00
                                                        264/460
2019/0248052 A1* 8/2019 Pawar ...................... B22F 10/66
(Continued)

FOREIGN PATENT DOCUMENTS

EP          4147854 A1      3/2023

*Primary Examiner* — Michael M. Robinson
(74) *Attorney, Agent, or Firm* — Honigman LLP; Eric J. Sosenko; Jonathan P. O'Brien

(57) ABSTRACT

A method of operating an apparatus for the layerwise manufacture of 3D objects. The method includes two or more operational cycles of a warm up phase, starting from ambient, followed by a build phase and a cooling phase. The warm up phase and the build phase each include a layer cycle of: (a) dosing build material to the work surface; (b) distributing a portion of the dosed amount over a build area; (c) heating the dosed amount; and (d) monitoring a temperature of the build material to determine a thermal state. The build phase includes melting layer-specific regions. These steps are repeated until the warm up and build phases are completed. A property of the subsequent warm up phases is determined such that the duration of a subsequent warm up phase is shorter than the duration of a preceding warm up phase.

20 Claims, 9 Drawing Sheets

(51) Int. Cl.
*B29C 64/343* (2017.01)
*B29C 64/386* (2017.01)
*B33Y 10/00* (2015.01)
*B33Y 50/00* (2015.01)

(52) U.S. Cl.
CPC ............ *B29C 64/386* (2017.08); *B33Y 10/00* (2014.12); *B33Y 50/00* (2014.12)

(56) References Cited

U.S. PATENT DOCUMENTS

2019/0270139 A1* 9/2019 Wuest .................... B22F 10/368
2021/0114096 A1* 4/2021 Nakamura ............... B22F 10/00
2023/0079559 A1* 3/2023 Dorini .................... B33Y 40/10
264/497

* cited by examiner

METHOD OF OPERATION FOR AN APPARATUS FOR LAYER-BY-LAYER MANUFACTURE OF 3D OBJECTS

BACKGROUND

1. Field of the Invention

The present disclosure relates to a method of operation for an apparatus for the layerwise manufacture of three-dimensional (3D) objects from build material. The method might find particular benefit in a powder bed fusion apparatus in which cross sections of 3D objects are formed within successive layers of particulate material using thermal processing. A controller and an apparatus for applying the method are also disclosed.

2. Description of Related Technology

In applications for forming 3D objects from particulate material, such as powder bed fusion applications like "print and fuse" and laser sintering applications, an object is formed layer-by-layer from particulate material spread in successive layers across a support. An area within each successive layer is melted to fuse, or partially melted or sinter, the particulate material, in order to form a cross section of the 3D object. In the context of particulate polymer materials, for example, the process of melting achieves fusion of particles. Typically, several heating devices are operated in a print and sinter apparatus to heat the particulate material during each layer cycle. For example, one or more infrared bar heaters may be moved across each layer to heat the layer surface (the build area) sufficiently to achieve fusion over selectively modified regions. The thermal processes of the layer cycle require accurate control to achieve high-quality, uniform objects with well-defined properties in a reliable, reproducible manner. At the start of a build process of an object, the apparatus typically is required to carry out a warm up process that ensures a steady thermal state at operational temperature has been reached for a stable environment for the build process. Such a warm up process may take up a significant period of time within the overall process of operation to build an object, which is undesirable specifically in an industrial environment requiring a high throughput rate of objects. Therefore, improvements to the warm up process are needed.

SUMMARY

Aspects of the invention are set out in the appended independent claim, while particular embodiments of the invention are set out in the appended dependent claims.

The following disclosure describes, in an aspect, a method of operation for an apparatus for the layer by layer manufacture of a 3D object from particulate material according to claim 1. A controller configured to carry out the method of that aspect is also disclosed.

BRIEF DESCRIPTION OF THE DRAWINGS

Reference is now directed to the drawings, in which.

In the drawings, like elements are indicated by like reference numerals throughout.

DETAILED DESCRIPTION

Figure 1:
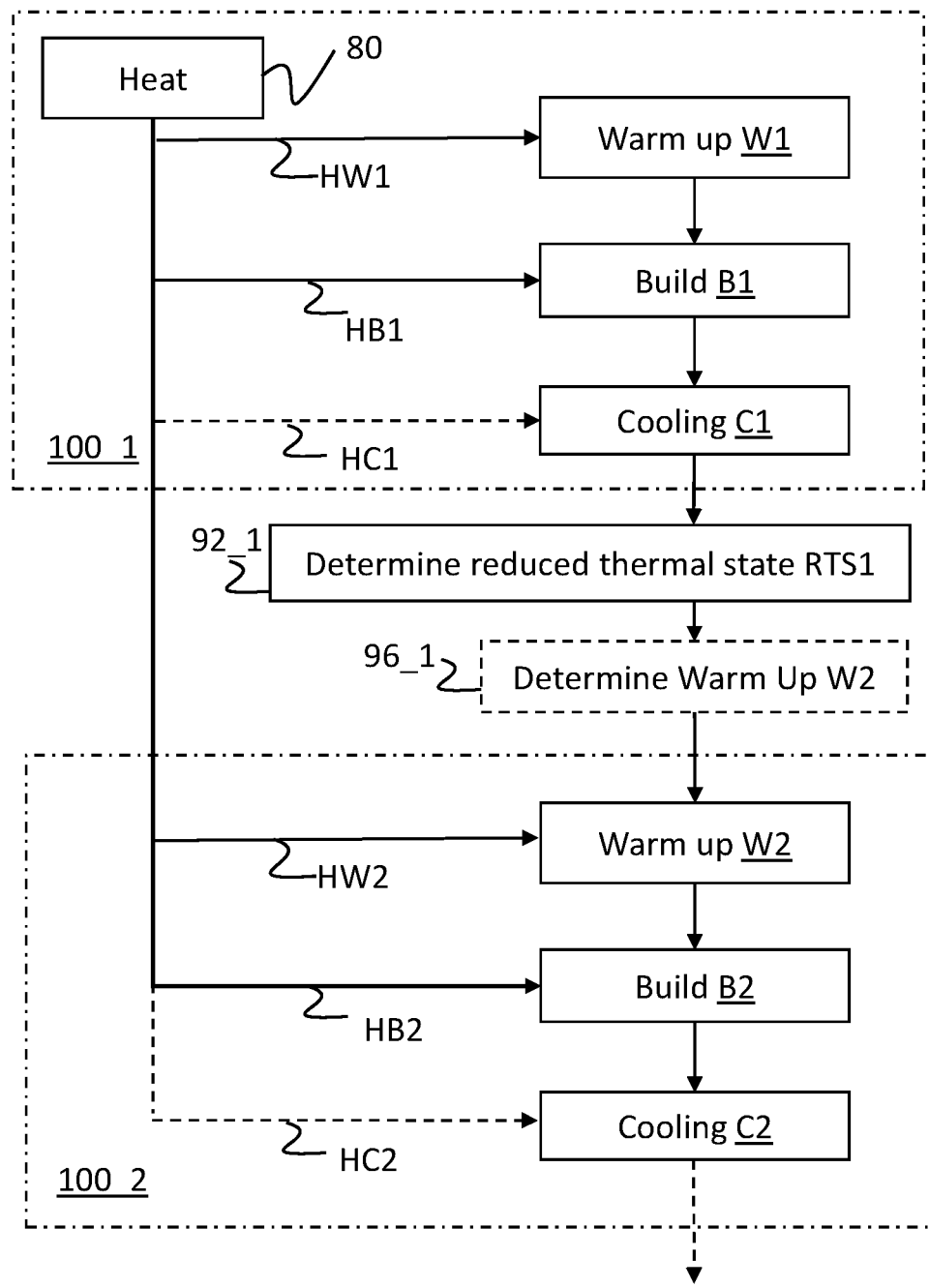
FIG. 1 is a schematic diagram of two operational cycles according to the invention.
Figure 2:
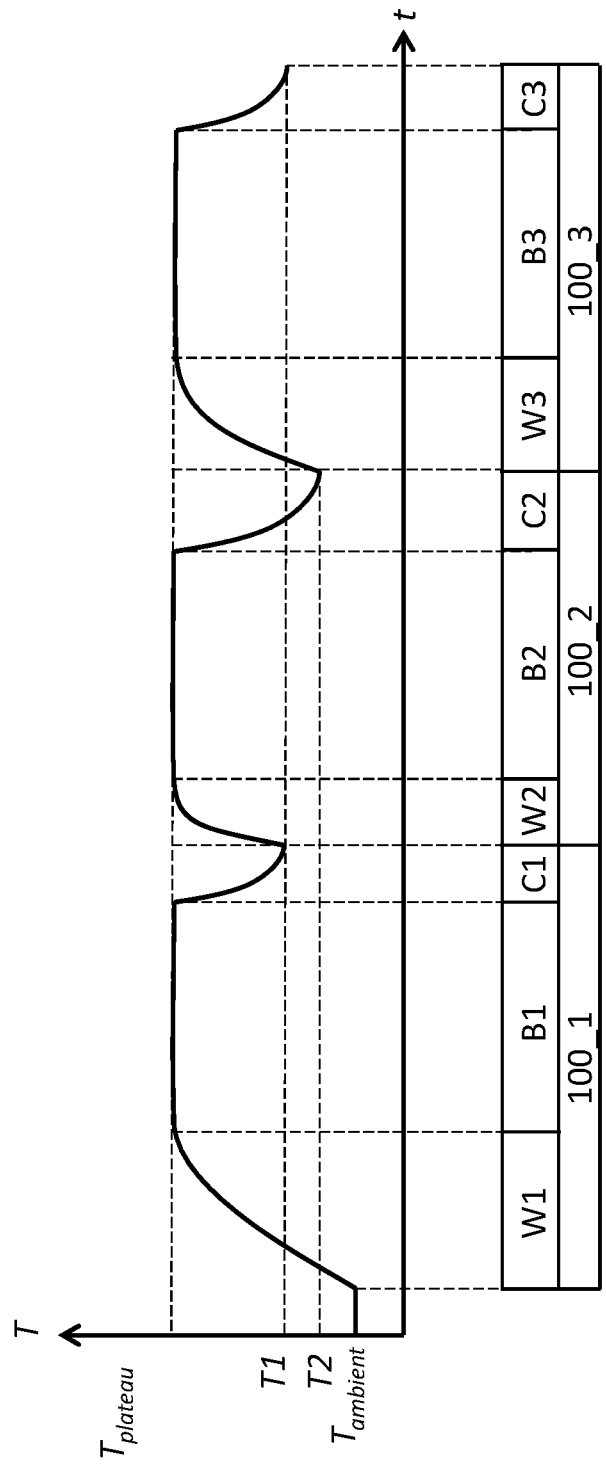
FIG. 2 is a schematic illustration of temperature over repeated operational cycles.
Figure 3A:
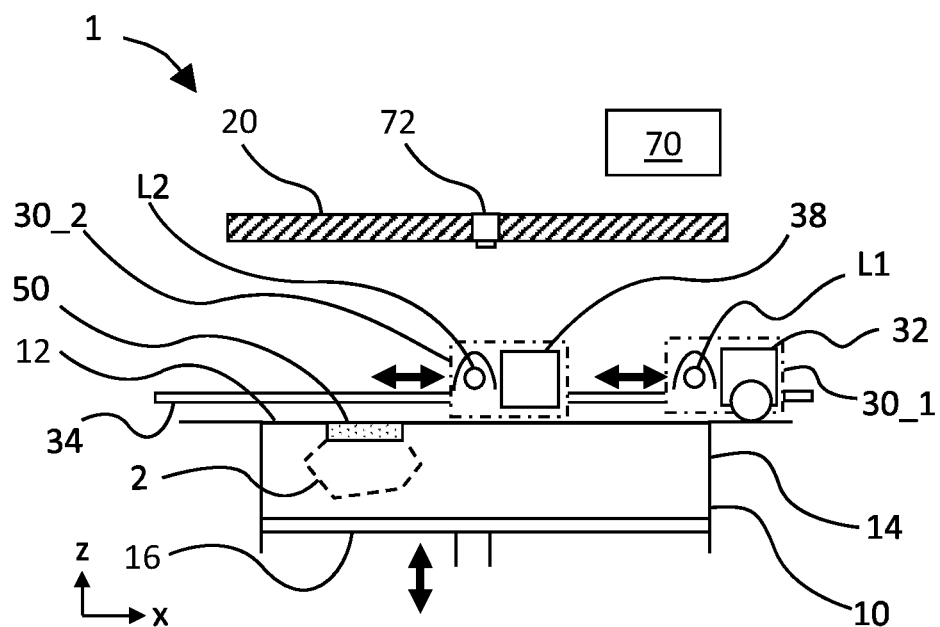
FIG. 3A is a schematic cross-section of a side view of an apparatus configured to apply the method according to the invention.
Figure 3B:
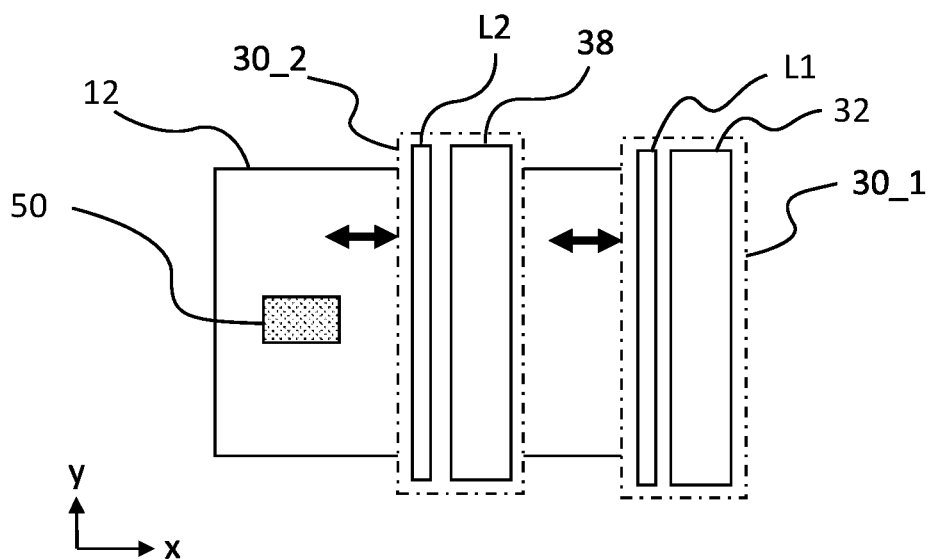
FIG. 3B is a schematic plan view of the build area of FIG. 3A.

Turning first to FIGS. 3A and 3B, an example of a 3D printing apparatus in form of a powder bed fusion type apparatus will be described, before turning to the method and its variants according to the invention that will be to be described with reference to FIGS. 1 to 11, and which the example apparatus is configured to carry out.

FIG. 3A is a schematic cross-section of a side view of a powder bed fusion type apparatus; and FIG. 3B is a schematic plan view of the build area of FIG. 3A. Herein, the powder or particulate material used in such apparatus will be referred to as "build material". In a typical build phase for the layerwise formation of a 3D object from build material, successive layers of build material are distributed over a piston 16, each top-most surface representing a build area, or build bed surface 12, which is processed to form successive cross-sections of an object 2. In this context, each newly distributed layer forms a new build area 12 that is the build area of the layer to be processed in that particular layer cycle.

As indicated in FIG. 3A, the apparatus 1 comprises a distribution module 32 for distributing each layer of particulate build material across a support or build area 12, a deposition module 38 configured to selectively deposit absorption modifier to define a layer-specific region 50 within the build area 12, and a heating module comprising a fusing heat source L2 to achieve selective heating of the layer-specific region 50. The layer-specific region 50 may represent a cross section of an object 2 or a test region in a calibration process. The term "layer-specific region" indicates that its position, shape and pattern is layer dependent, and its purpose may be different for different phases of an operational phase of the apparatus. The modules may be provided on one or more carriages moveable across the layer. In the example of FIG. 3A, an implementation with two carriages 30_1 and 30_2 is shown. The carriages are arranged on one or more rails 34 that allow them to be moved back and forth over the build area 12 along a first direction, e.g. along x, and along a second direction opposite the first direction. The first carriage 30_1 in this variant comprises the distribution module 32, for example comprising a build material distributor or distributing device in form of a roller as shown. The second carriage 302 comprises the deposition module 38, such as a droplet deposition module configured to deposit the absorption modifier in the form of fluid droplets. Mounted behind the deposition module 38, with respect to the first direction, is the fusing heat source L2.

Where the distribution module is a roller, a fresh portion of powder is dosed to a work surface to the right of the roller and to the left of the build area 12, the work surface comprising the build area 12, and the portion is spread over the build bed 14 as the roller is moved over the build area 12. Alternatively, the distribution module 32 may contain build material that is gradually released and spread over the build area 12 as the module is moved over the build area 12. The build bed 14 is contained between walls 10 and supported on a platform 16, which is arranged to move vertically within the container walls 10 to lower or raise the build area 12; for example by a piston located beneath the platform 16. As will be described in more detail below, the apparatus further comprises a dosing device to supply a dosed amount of build material to be distributed across the build bed 14, thus forming a new build area 12.

FIG. 3B shows a plan view of the build area 12 of FIG. 3A with the layer-specific region 50 and the carriages 30_1 and 30_2 with the distribution, deposition and heating modules spanning the width of the build area 12 (along y). As indicated before, each carriage 30_1, 30_2 is moveable back and forth along the x-axis, which herein is also referred to as the length of the build area 12, the length being perpendicular to the width, however reference to length and width is not intended to indicate relative extent of the two directions but to merely help reference directions of the process.

The absorption modifier may be radiation absorber deposited over the layer-specific region 50, and/or absorption inhibitor deposited over a surrounding area surrounding the layer specific region 50. Selectivity, or preferentially heating the layer-specific region 50 versus the surrounding area, is achieved by providing a fusing heat source L2 with a spectrum of radiation that is absorbed to a higher degree by the radiation absorber compared to the surrounding area. If the combination of absorber and power input to the fusing heat source L2 (causing a certain energy input to the region 50) is sufficient, the build material of the layer specific region 50 partially melts (sinters) or melts fully to form a region of consolidated build material. Thus, during a build phase of an object, the radiation absorber may be deposited over layer-specific regions 50 of the build area 12 so that layer-specific cross sections of the object 2 may be formed within successive layers.

During a typical build phase, the build area 12 is maintained at or close to a predefined target layer temperature that is below the melting temperature of the build material and above the solidification temperature. This means it may for example be maintained within a temperature range of 10-20° C. below the melting temperature. The fresh particulate material dosed to the work surface to be distributed across the build area 12 is generally at a significantly lower temperature, for example 40° C. or more below the melting temperature, such that the distributed layer has a significant cooling effect on the build area 12 of the previous layer. Such large temperature differentials can cause warping of the fused parts, such that it is desirable to increase the temperature of the distributed layer to, or closer to, the target layer temperature of the build area 12 without unnecessary delay. Therefore, it is desirable that the dosed build material is already at an elevated temperature, for example below the glass transition temperature of the material and/or a thermal degradation temperature. This may be achieved by heating for example some or part of the dosing device, to a predefined temperature throughout the operation of the apparatus. The preheating heat source L1 may be provided behind the distribution module 32 to immediately preheat the freshly distributed build material further, to a temperature closer to the target layer temperature. This avoids an excessive cooling by the newly distributed layer, and by providing build material to the work surface 8 at an elevated temperature avoids having to operate the first (preheating) heat source L1 at an unduly high power to achieve the target layer temperature quickly. Such high powers may degrade the build material. The melting temperature of the build material may be defined in terms of the onset of melting, TM, onset, and the solidification temperature may be defined by the onset of solidification or by the onset of crystallisation, Tc, onset, for example as may be determined by the method prescribed in ISO 11357-1 (2009). The difference in Tm or Tc is typically larger than the difference in TM, onset and Tc, onset and defines the sintering window within which the target layer temperature or the target layer thermal state may be defined. The target layer thermal state may represent the target steady state TSTS for the build process.

The two moveable heat sources will be referred to with respect to the order in which they heat each layer; thus the preheating heat source L1 following the distributor is herein also referred to as "first heat source", L1, and the fusing heat source following the deposition module, and typically used to fuse the particulate material of the layer specific region during a build process, is referred to as "second heat source", L2. The wavelength spectrum of the first heat source L1 is such that, over a preheat period of time, it is capable of sufficiently preheating the layer-specific region 50 and the surrounding area, both being void of radiation absorber, up to or towards the target layer temperature. The target temperature may be achieved in combination with, for example, operating an overhead heater 20 provided stationary above the build area 12 as shown in FIG. 1. As for the second heat source L2, the period of time over which the second heat source L2 heats the layer specific region 50 may be determined by the speed at which the first heat source L1 traverses, and transfers heat to, the layer-specific region 50.

The build area 12 may be monitored by a thermal sensor 72 provided above the build area 12. The thermal sensor 72 may be a thermal camera or a pyrometer within the area of the overhead heater 20 and centrally mounted above the build area 12, or it may be provided on one or both of the carriages 301_, 30_2 in the form of a thermal line scan sensor. The measurements from the thermal sensor 72 may be used to apply feedback control to one or more of the heating devices involved in heating the build area 12, for example to the overhead heater 20. When the overhead heater 20 is adequately controlled, via a controller 70, local differences in temperature across the build area 12 may be reduced, which may improve object quality by enhancing control over mechanical and visual object properties.

Figure 4:
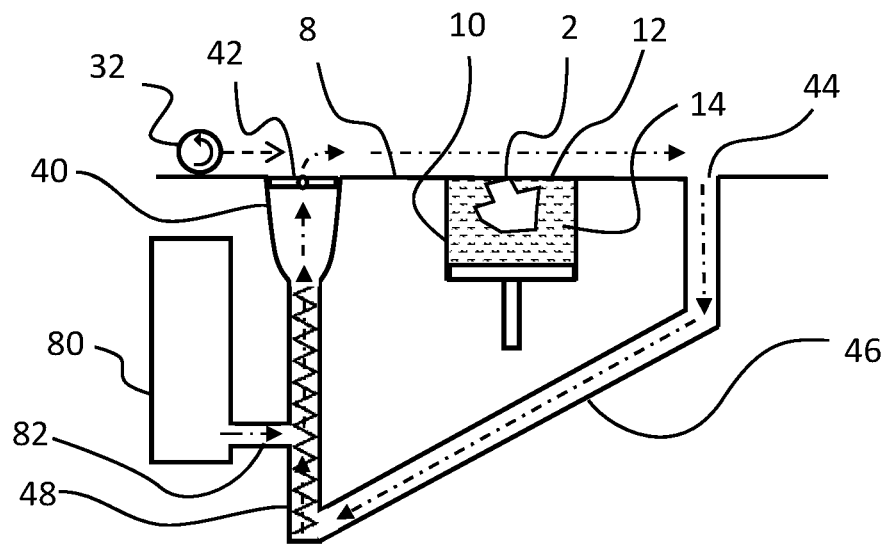
FIG. 4 is a schematic cross-section through an example build material supply system suitable for the apparatus of FIG. 3A.

Adequate control requires thermal stability of the apparatus before the build phase is started. In order to repeatably form layers of highly uniform thickness, some apparatus may be configured such that the dosed build material comprises a surplus amount to form the layer. This ensures that each layer is fully formed. The surplus amount may be handled most efficiently by returning it to the dosing device during normal operation within the apparatus, without having to remove, treat and return the surplus material from and to the apparatus. Preferred variants of the apparatus 1 may thus comprise build material systems configured to automatically recirculate surplus build material to the dosing device in situ of the apparatus as shown in FIG. 4, which is a schematic cross-section through the recirculating supply path of two alternative arrangements that may be provided within the apparatus of FIG. 3A. Such a recirculating system allows efficient reuse of surplus build material. FIG. 4 illustrates the recirculation path of build material indicated by dotted-dashed arrows. Build material is supplied to a dosing device in the form of a dosing chamber 40, here shown arranged below the work surface 8 comprising the build area 12, from a supply tube 48. The supply tube comprises a build material lifting device such as an auger conveyor.

The lifting device in the supply tube 48 is fed from a supply tank 80 connected to the supply tube via a tank connection 82. From the dosing chamber 40, a dosed amount of build material is provided to the work surface 8 through an opening in the work surface by a rotating blade 42. During its rotation, the rotating blade 42 is arranged to sweep up an amount of build material from the build material within the dosing chamber 40 and deliver it to the surface, for example by temporarily being level with the surface 8 (as shown) while supporting the dosed amount above the surface 8 until the distributor 32 has passed. To form a layer over the build area 12, the platform 16, supporting the build volume 14 within container walls 10, is lowered by a layer thickness so as to form a recess within the build container walls 10 and the build area 12. After dosing the build material to the surface 8, the distributor 38 is passed over the surface 8 along the direction of the dashed arrow to push the dosed amount across the build area 12. As the dosed amount is pushed across the build area 12, a layer portion of the dosed amount fills the recess formed within the build container walls 10 and the build area 12, thus forming a fresh layer with a new build area 12. The surplus portion of the dosed amount that is not used to form the new layer is pushed into a recirculation opening 44 to be returned to the supply tube 48 via a recirculation tube 46. By arranging the connections between the tubes as shown, the surplus portion of build material is fed into the supply tube 48 and returned to the dosing chamber 40 before fresh build material is drawn from the tank 80. The recirculation system is thus arranged to efficiently reuse the surplus portion of the dosed amount of build material. Further variants of such a recirculating system may include a dosing device that feeds build material from above the build bed surface, supplied from an overhead tank that is configured to receive and mix fresh build material from a fresh build material tank with build material returned from the receiving chamber. Such as system may be configured to transport the build material with one or more powder pumps.

Figure 5:
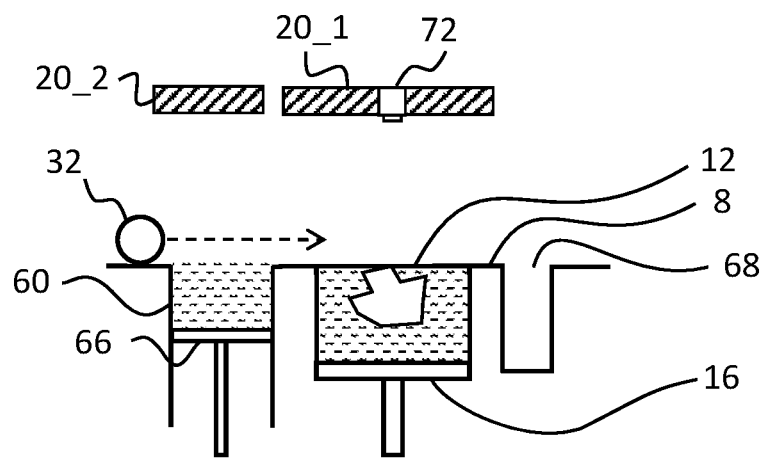
FIG. 5 illustrates an alternative system to the one of FIG. 4.

Some apparatus may not recirculate the build material. An alternative build material supply system is shown in FIG. 5, in which the receiving chamber of FIG. 4 is replaced by a waste container 68 into which the surplus portion of build material may be pushed. The waste amount is removed from the apparatus and may be treated to be reintroduced into the apparatus, but it is not recirculated in-situ.

The powder may be supplied in any suitable form to the work surface 8. FIGS. 3A and 4 show a dosing device in the form of a dosing chamber 40 in which the build material may be stirred to maintain it in a free flowing form, and supplied to the work surface 8 by a dosing blade. Alternatively, the build material may be supplied from a dosing chamber that is in the form of a feed bed container 60, further illustrated in FIG. 5. In this supply system, a supply amount of build material is supported in a feed bed container 60 similar to that holding the build volume 14. A platform 66 supports the build material supply volume and is vertically moveable within the feed bed container walls by a piston configured to lift the supply volume. With the distributor 32 in the position as shown, the feed bed volume is lifted by a specified distance above the work surface 8. The specified distance is chosen such that the volume of supply material above the work surface is sufficient for forming a layer over the build area 12. The distributor 32 is moved from left to right to push the lifted ("dosed") amount over the build area 12 to form a layer. In the system shown, the distributor 32 may push a surplus portion into the waste container 68 to the other side of the build area 12.

To ensure thermal stability before a build phase, the build material within the supply system is brought to a stable temperature above ambient temperature, which is a temperature at which the apparatus is at the thermal state of its surroundings and may be referred to as the 'cold' thermal state. Thermal stability before the build phase may be achieved by e.g. heating the build material within the supply pipes and/or dosing chamber 40, 60 to a stable temperature that is 30-80° C. below the melting temperature of the build material. For polyamide PA11, which has a melting temperature of around 190° C., this may be at temperature from 100° C. to 160° C. The build area 12 may be required to achieve a steady thermal state at a higher temperature, closer to but below the melting temperature, at for example a target layer temperature of around 180° C. It is desirable to reach a stable thermal operational state, TSTS, of the build material path within an acceptable time for an industrially viable manufacturing process requiring high throughput of objects.

An improved method of operation for an apparatus for the layerwise manufacture of 3D objects from particulate material for carrying out repeated operational cycles comprising a warm up phase Wn, followed by a build phase Bn to manufacture one or more objects, followed by a cooling phase Cn which comprises removing the plurality of warm up layers and/or the plurality of build layers from the support 16 (e.g. by transferring the plurality of warm up and build layers into a transport box) and/or the apparatus 1 (e.g. by removing the support with the plurality of layers, to cool down outside of the apparatus), where n is the number of the operational cycle, will now be described, initially with reference to the flow diagram of FIG. 1 showing two cycles 100_1 and 100_2 of operational cycles 100n, and the apparatus of FIGS. 3A and 3B. The warm up phase Wn and the build phase Bn each comprise a layer cycle 200 that is described in more detail with reference to FIG. 11 below. Herein, the layer cycle may comprise the steps of (a) dosing an amount of build material to a work surface 8 of the apparatus 1, the work surface 8 comprising a build area 12 provided over a support 16; (b) distributing at least a layer portion of the dosed amount over the support 16 so as to form a layer, each layer surface forming a new build area 12; and (c) heating, at one or both of steps (a) and (b), the dosed amount. The step of heating is indicated by block 80 in FIG. 1 at warm-up heating conditions HWn and at build phase heating conditions HBn. Heating may comprise one or more of heating with the first heat source L1 while passing it over the build area 12, heating with the second heat source L2 while passing it over the build area 12, heating with the stationary heat source 20, and heating the build material within the dosing chamber, for example. The layer cycle comprises a step (d) of monitoring at one or more of steps (a) to (c) a temperature of the build material so as to determine a thermal state TS. The build phase Bn further comprises at step (c): selectively melting a layer-specific region 50 defined within the build area 12 to form a cross section of the one or more objects 2, for example by depositing radiation absorber over the layer specific region 50 such that the step of heating causes melting within the layer specific region 50. Steps (a) to (d) are repeated to form a respective plurality of layers each until the warm up phase Wn and the build phase Bn are complete. According to the method, each operational cycle 100n comprises: achieving, over the plurality of warm up layers of the warm up phase Wn, a target steady thermal state TSTS as determined from the measured thermal state TS before progressing to the build phase Bn; substantially maintaining the target steady thermal state TSTS over the plurality of build layers; exiting the target steady thermal state TSTS and achieving over a duration of the cooling phase Cn a reduced thermal state RTSn; determining the reduced thermal state RTSn, indicated at block 92_1 for the first operational cycle 100_1. Where the determined reduced thermal state RTSn is above the ambient thermal state, the method comprises determining a property of the further warm up phase Wn+1 (here W2) based on the reduced thermal state RTSn of the preceding cooling phase Cn, such that the duration of the further warm up phase W2 is shorter than that of the previous warm up phase W1. Herein, references to "above" and "below" with respect to thermal state are intended to refer to a respective higher or lower temperature determined at one or more representative locations of the build material path to measure or indicate the temperature of the build material. For example, the thermal state TS determined from a temperature of the build material measured within the dosing chamber 40 may be lower after a short cool down period than the thermal state TS determined by the same sensor after initiation of the warm up phase or build phase. The lower temperature may thus be used to represent a reduced thermal state compared to that determined after initiation of the warm up phase or build phase.

In this way, the further warm up phase of a further operational cycle may be controlled such that its duration is shorter than the initial warm up phase from an ambient state, or shorter than a previous warm up cycle of a preceding operational cycle. The heating conditions along the build material path need to be carefully selected and controlled so as to avoid degradation of the build material due to excessive heating, while avoiding excessive warm up phase durations. For example, an initial warm up phase from ambient state may have a duration of 90 min for PA11, and a time saving of at least 15 min or 30 min compared to an initial warm up phase may be desirable. For example, at least around a 20-30% reduction in duration compared to an initial warm up phase may be preferred. This may comprise pre-determining at block 94_1, based on the reduced thermal state RTSn, the one or more properties of the next warm up phase Wn+1 (here W2). In variants, the property may be a duration of a sub-stage of the further warm up phase, such as a duration of a non-layering stage as will be described below. Such as duration may be the result of a feedback loop of monitoring the thermal state during the sub-stage while providing heat to the build material path of the build material within the apparatus until a predefined target thermal state has been achieved. The build material path may comprise dosing from a dosing chamber 40 to a work surface 8, distributing over a platform 16 or build area 12, and, in recirculating apparatus such as the one illustrates in FIG. 4, returning any surplus dosed amount not used in forming a layer to the dosing chamber in situ the apparatus.

Herein, a stable thermal state may be location dependent with regard to locations of the build material path, and may not represent the same temperature. For example, the build material in the dosing chamber is typically at a lower temperature than the build area, and may thus be at a lower thermal state than the build area. The one or more properties of the warm up phase may for example comprise the number of layers, and may be determined such that a duration of the further warm up phase is shorter than that of the preceding warm up phase. The thermal state TS may be determined by one or more measured temperatures of the build material, for example a temperature of the build material within the dosing chamber 40, such that the step of dosing the amount of build material comprises dosing the amount of build material from the dosing chamber 40 to the work surface 8. Additionally, or instead, the thermal state TS may be represented by, or based on, one or more measured temperatures of the build area 12 during the layer cycle 200 of the warm up phase Wn and the build phase Bn. The target steady thermal state TSTS may represent the stable operational thermal state of the apparatus during a stable build phase. The target steady thermal state may be based on one or more measured temperatures; for example during the build phase it may be represented by or based on the target layer temperature, optionally or instead in combination with a target dosing temperature of the build material within the dosing chamber. As described above, the target layer temperature may be 10-20° C. below the melting temperature of the build material, and a target dosing temperature may be 60-80° C. below the melting temperature of the build material. The target steady thermal state TSTS may be substantially the same for each operational cycle 100n, for example where each build phase Bn is identical. The target thermal state may be based on or represent the target layer temperature. In variants, the target thermal state may differ between adjacent operational cycles.

Figure 6:
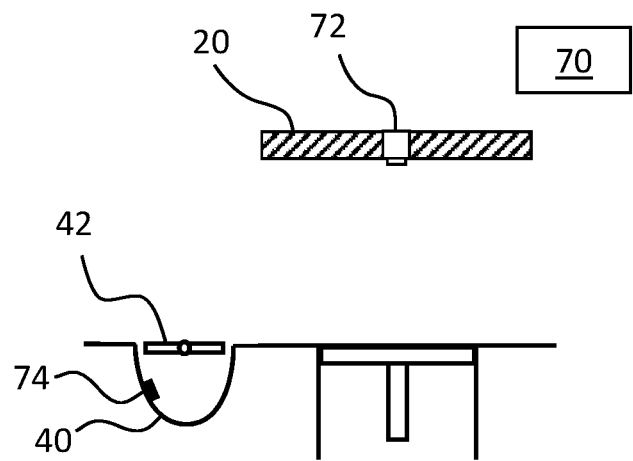
FIGS. 6 and 7 illustrates locations of a thermal sensor in a simplified variant of FIG. 4.
Figure 7:
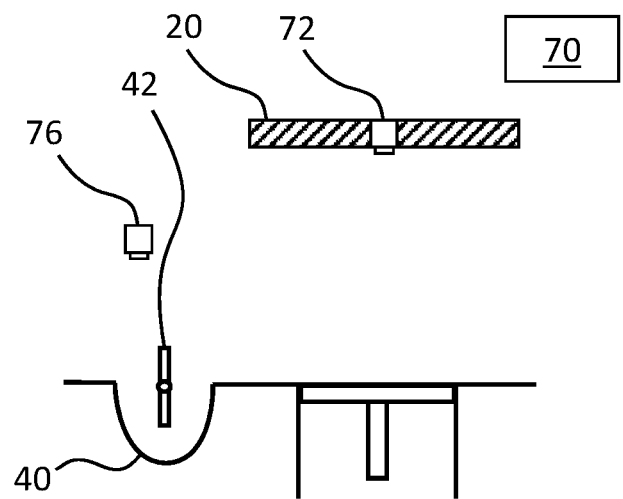

The reduced thermal state RTSn may typically be a thermal state lower than the steady operational state, target steady thermal state TSTS, since exiting the build phase Bn and accessing the apparatus 1 to remove a build volume 14 typically requires stopping the operation of at least some of the heat sources, and generally results in a loss of heat from the build material path. Furthermore, the reduced thermal state RTSn is an elevated thermal state from the ambient state so as to achieve a reduced duration for a further warm up phase applying substantially the same thermal cycle as during the preceding warm up phase. This may be preferable so as to provide a stable thermal cycle of substantially the same shape as the build phase. It is not necessary that the temperature levels of the thermal cycle are substantially the same throughout most of the warm up phase; however it is preferable that the temperature levels are substantially the same in the one or more warm up layers adjacent the build layers of the respective build phase. The thermal state TS of the of the build material may be monitored and/or determined in a number of ways, for example by using a temperature sensor arranged to measure the temperature of the build material inside the dosing chamber 40. For example, FIG. 6 illustrates a temperature sensor 74 provided to a wall of the dosing chamber 40. Alternatively, a remote thermal sensor 76 such as a pyrometer, as illustrated in FIG. 7, may be arranged above the opening to the dosing chamber 40, and as the dosing blade 42 is in a non-horizontal position, or in a vertical position as shown, the remote thermal sensor may image the surface of the build material inside the dosing chamber 40 and thus provide a measurement of the thermal state of the build material. In this case the thermal state TS may be monitored intermittently at least once during each cycle 100. This may also be done while the apparatus is undergoing the cooling phase Cn, where the carriages may be in a parking position to one side of the build area 12 and the various heat sources may be temporarily switched off during at least part of the cooling phase Cn. For a feed bed dosing system as shown in FIG. 5, a further stationary heater 202 may be provided above the feed bed surface 60 and arranged to radiatively heat the feed bed surface remotely from above, while a remote temperature sensor such as a pyrometer or second thermal camera provided above the feed bed (not shown), or the primary thermal sensor 72, may be used to monitor the temperature of the feed bed surface. The thermal state during the cooling phase Cn may also be monitored in this way. A variant may comprise distributing one or more test layers at the end of the cooling phase Cn and measuring a temperature of the build area 12 using the thermal sensor 72 above the build area 12 and comparing it to the target layer temperature. The thermal state may thus be measured by any suitable thermal sensor, thus allowing determination of the reduced thermal state RTSn or any of the target and threshold states that will be described below that may be defined to provide further control over the operational cycle. The thermal state and the reduced thermal state RTSn may be represented by a single or average temperature Tn, and/or be based on a number of measurements taken by a plurality of thermal sensors and/or at different locations of the build material within the apparatus.

Thus a subsequent warm up phase may be tailored to a reduced (cooler) thermal state RTSn at the end of the preceding cooling phase Cn, where the reduced thermal state is an elevated state from an initial ambient temperature state of the apparatus. Optionally, the cooling phases Cn are controlled such that the reduced thermal state RTSn does not fall to the ambient temperature state. For some operational cycles 100, the reduced thermal state RTS measured before initiating a further operational cycle may be based on, or represented by, a different reduced thermal state (higher or lower) than that determined before initiating a preceding operational cycle. Where the preceding operational cycle started from ambient, the next operational cycle starts from a reduced thermal state higher than ambient according to the improved method disclosed herein. This provides an improvement over known methods, in which the same warm up phase is applied regardless of the actual thermal state, thus unnecessarily delaying the start of the next build phase or unnecessarily distributing layers during the warm up phase, and therefore not achieving improved throughput, or maximum throughput, of parts. The improved methods described herein may be particularly suitable for an industrial process, where the same build phase is applied two or more times after respective cooling phases and warm up phases to manufacture the same one or more objects multiple times (i.e. over multiple operational cycles in which each build phase Bn is identical), and/or in which the cooling phase Cn may be restricted to a duration that prevents a loss of heat to or close to ambient state.

FIG. 2 schematically illustrates the thermal state TS represented by a measured temperature T, which may be an average temperature determined from multiple measurements over time or locations, over three consecutive operational cycles 100_1, 100_2, and 100_3. The temperature sensor may be one of the sensors 74, 76 exemplified in FIGS. 6 and 7. Each operational cycle 100n is indicated by a labelled bar extending along the time direction. Each operational cycle 100n further has a warm up phase Wn, a build phase Bn and a cooling phase Cn as indicated by a second set of bars extending along the time direction beneath the operational cycle bars. The length of each bar represents the duration of the respective phase and operational cycle.

At the start of the initial operational cycle 100_1, the apparatus requires a warm up phase W1 from ambient thermal state, represented by $T_{ambient}$. The temperature rises over the warm up phase W1 by operating one or more of the heat sources of the apparatus configured to heat the build material at one or more locations throughout the build material path of the build material. Once a substantially stable, constant thermal state, which represents the operational thermal state, or target steady thermal state TSTS, has been achieved as indicated by $T_{plateau}$, the operational cycle 100_1 can progress to the first build phase B1. During the build phase B1, the target steady thermal state TSTS is maintained, i.e. the monitored temperature representing the thermal state TS remains substantially at $T_{plateau}$. This ensures a repeatable build phase during which objects may be manufactured to a predictable accuracy and mechanical performance. Once the build phase B1 is complete, a cooling phase C1 begins during which the thermal state is reduced to RTS1, as represented by temperature T1. The reduced thermal state RTS1 of the first cooling phase C1 is significantly higher than the ambient thermal state, $T1 > T_{ambient}$. As a result, in order to achieve the target steady thermal state TSTS or the next build phase B2, the second warm up phase W2 of the second operational cycle 100_2 may be reduced in duration compared to the initial warm up phase W1. The second build phase B2 may thus commence sooner with respect to the start of the operational cycle compared to the first build phase B1, thus saving time and increasing the throughput rate of the apparatus. In other words, the proportion of time the apparatus applies a build phase compared to a warm up phase is increased over the number of cycles until the apparatus is allowed to cool again to ambient state. The second build phase B2 is followed by a second cooling phase C2. In the example of FIG. 2, the second cooling phase C2 is of longer duration compared to the first cooling phase C1, for example because more extensive maintenance may need to be carried out. As a result, the reduced thermal state RTS2 of the second cooling phase C2 is represented by a temperature T2 lower than T1 of the first cooling phase C1. This means that the next operational cycle 100_3 starts with a warm up phase W3 that is longer than the second warm up phase W2 but shorter than the initial warm up phase W1. In this way, the warm up phase may be tailored based on the reduced thermal state RTSn of the previous operational cycle.

Preferably therefore, to minimise the duration of the operational cycle over a number of operational cycles over which the thermal state does not fall to the ambient thermal state, the cooling phase is kept as short as possible. Where manual labour is involved, it may be challenging to achieve exactly the same cooling phase conditions each time. In addition, certain maintenance routines may need to be carried out, which may be defined by frequency of operational cycles. It may therefore be beneficial to predefine certain targets and thresholds for the thermal state based on which the next warm up phase is chosen or dynamically designed. For example, a threshold thermal state $TS_{threshold}$ may be defined that is above the ambient thermal state, for example 20° C. above ambient, below which the reduced thermal state may not fall to ensure efficient operation, and provide a selection of warm up phases based on several ranges of thermal states. If the reduced thermal state RTSn is instead allowed to fall below the threshold thermal state $TS_{threshold}$, the initial warm up phase W1 that provides the operational steady state TSTS from ambient conditions may need to be applied in the next operational cycle, i.e. the apparatus is treated like starting from ambient.

The thermal state, as represented for example by the temperature of the build material inside the dosing chamber 40 (or feed bed 60), may be monitored throughout the cooling phase and reported to the user. Once the temperature nears the threshold thermal state $TS_{threshold}$, the user may be alerted to complete the cooling phase such that a "warm start" may be applied to reduce the duration of the next warm up phase. Where the reduced thermal state RTSn at or above the threshold thermal state $TS_{threshold}$ and up to an elevated thermal state of for example the threshold thermal state $T_{threshold}$ plus 10° C., a first type of warm up phase may be applied in the next operational cycle. Where the reduced thermal state is from the threshold $TS_{threshold}$ plus 10° C., and the threshold $TS_{threshold}$ plus 20° C., a second type of warm up phase may be applied in the next operational cycle.

The type may be defined in terms of numbers of layers of the warm up phase Wn. Instead of providing a fixed selection of warm up phases, the next warm up phase may be dynamically adjusted based on the RTSn and a base warm up phase adjustable based on a full range of measured values of RTSn; for example any integer number of layers of a further warm up phase of a further operational cycle may be based on the reduced thermal state. Thus where the reduced thermal state is below the threshold thermal state, the full number of warm up layers may be applied in the next warm up phase, effectively re-starting the method of operation from the beginning. Where the reduced thermal state is above the threshold thermal state $TS_{threshold}$, fewer layers compared to the initial warm up phase C1 may be applied to the further warm up phase C2; where the fewer number may be predefined or dynamically adjusted based on the actual reduced thermal state RTS1. Different types of warm up phases having shortened durations compared to a previous war up phase are described below. The reduced thermal state may be used to determine one or more properties of the next warm up phase, such that the properties of the next warm up phase may be dynamically determined based on the determined reduced thermal state. Properties of the warm up phase may further comprise operational detail of each layer cycle step. Variants of the layer cycle 200 will be described in more detail below, with reference to FIG. 11.

Typically, the build volume 14, which may be at 160-180° C. for build material comprising polyamide, is allowed to cool at least initially under controlled conditions. This may comprise operating some of the heat sources in the apparatus, for example the stationary heat source 20 above the build area, over at least an initial period of the cooling phase so as to control the cooling rate. This prevents uncontrolled shrinkage and warping of the objects within the build volume 14. Optional heating conditions HCn during the cooling phase Cn are indicated in FIG. 1 between the heating block 80 and each warm up phase, build phase and cooling phase of the operational cycles 100_1, 100_2. The heating conditions HC1 may be different to the heating conditions HC2 for the two different cycles shown, and may for example depend on the volume of the build bed, as formed by the plurality of warm up and build layers. After this initial period of controlled cooling HCn, these heat sources may be switched off to allow a user to access the interior of the apparatus to remove the build volume in a safe manner. In addition, certain maintenance may be carried out. After removing the build volume 14 and carrying out any potential maintenance, the thermal state TS has reached a reduced thermal state RTS that is significantly below the operational thermal state TSTS. The methods disclosed herein may preferably comprise controlling or providing the cooling phase such that the reduced thermal state remains above the ambient thermal state. For example where the ambient thermal state may be represented by a build material temperature of 21° C. within the dosing chamber, and the operational thermal state TSTS by a temperature of 180° C. of the build area as measured by the thermal sensor 72 above the build area 12, and/or by a build material temperature of around 100° C. within the dosing chamber, the duration of the first warm up phase from ambient may take 90 min. The reduced thermal state RTSn may preferably be no lower than a dosing chamber temperature of 50-80° C. By starting the next operational cycle in a "warm" state, at elevated temperature from ambient, a time saving of 15 min-30 min compared to the initial warm up phase W1 starting from ambient temperature may be achieved for the duration next warm up phase W2. Preferably, the next cooling phase Cn+1 is controlled or provided such that it starts above ambient temperature, and preferably at a temperature representing the threshold thermal state $TS_{threshold}$ that is at least 20 to 30° C. above ambient thermal state.

The build phase B1 in the example of FIG. 2 has the same duration as the further build phases B2, B3; wherein the cooling phases and the resulting subsequent warm up phases are different. In variants, one or more of the build phases may be different from the others to manufacture a different set of objects compared to another build phase. The number of layers of a further build phase of a further operational cycle may be based on the fewer number of layers of the further warm up phase, such that the further build phase comprises more layers than the preceding build phase. For example, due to the fewer warm up layers, the maximum build volume will allow for more build layers in the next build phase, so that the user may chose, or preprogramme, to add a number of layers comprising further objects to the next build phase. Alternatively, a build phase with more layers may allow a taller object to be built within the maximum build volume.

As described with reference to FIG. 3A to 7, the apparatus 1 typically comprises a plurality of thermal components, comprising for example a thermal sensor 72 arranged above the build bed, and/or a temperature sensor 74 mounted to a wall of the dosing chamber 40, or a remote thermal sensor 76 such as a pyrometer arranged to at least intermittently image the build material inside the dosing chamber 40. Any one or more of these sensors may be suitable for carrying out step (d) of monitoring the thermal state of the build material. Furthermore, the apparatus typically comprises one or more radiative heat sources configured to carry out the step (c) of heating the dosed amount, such as the first radiative preheating heat source L1 moveable across the build area 12, and the stationary heat source 20 arranged above the build area. Furthermore, the second, or fusing, radiative heat source L2 moveable across the build area 12 may be provided to heat the dosed amount, for example by travelling ahead of the distribution device 32 while irradiating and heating the dosed amount as it is being pushed in front of the distributor over the build area. The spectrum of the fusing heat source may be such that it causes warming of the build material in absence of absorber, and only causes fusion in the presence of absorber. Any of these components significantly contribute to the thermal state and its control of the build material path during operation and are herein referred to as 'thermal components'. In relation to the heat sources, the step (c) at block 80 of heating during the layer cycle may comprise at least two of: (c1) heating the build area 12 with the stationary heat source 20 by operating the stationary heat source above the build area 12 in response to the thermal state monitored at step (d); (c2) following the step (b) of distributing at least a layer portion of the dosed amount over the build area: heating the build area 12 by passing while operating the first heat source L1 over the build area; and (c3) following the step (c2), and, where present, the step of depositing absorption modifier: heating the build area 12 by passing while operating the first heat source L1 or the second (fusing) heat source L2 over the build area. In other words, during the warm up phase, both the preheating and fusing heat sources (in the absence of radiation absorber) may be operated to heat the build material without causing fusion.

To form a cross section of an object, or test object, the layer cycle of the build phase Bn may comprise both steps (c2) and (c3) of heating by the first and second heat sources L1, L2; wherein, between the steps of heating with the first heat source L1 and the second heat source L2, radiation absorber is deposited over a layer-specific region 50 and/or absorption inhibitor is deposited over a surrounding region surrounding the layer-specific region 50, wherein the step of heating with the second heat source L2 causes the build material within the layer-specific region to selectively sinter or melt. In other words, the second heat source L2 is operated as a fusing heat source during the build phase and the first heat source L1 is operated as a preheat source to preheat the newly distributed layer to a temperature between the glass transition or solidification temperature and the melting temperature of the build material. Step (c1) of operating the stationary heat source 20 may be applied in addition to heating with the first and second heat source, and may be applied by operating the stationary heat source 20 continuously throughout the layer cycle. Where the supply system is a feed bed system as shown in FIG. 5, a further thermal component may be a secondary stationary heat source 222 arranged above the feed bed. Such as secondary stationary heat source 222 may be used to preheat the surface of the feed bed so as to heat the amount of powder to be dosed, i.e. removed by the distributor, and thus exposing a cooler feed bed surface.

The plurality of warm up layers and build layers may be removed together with the support. For example, the apparatus may comprise a removable build container comprising the support 16 and container walls 10, which may be replaced by a new build container. The new build container may be preheated and not enter the apparatus above the ambient thermal state, thus allowing a reduced warm up phase. Therefore, exiting the target steady thermal state and achieving a reduced thermal state may comprise removing the plurality of warm up layers and the plurality of build layers from the apparatus. Removing the plurality of warm up layers and the plurality of build layers may comprise removing the support 16 from the apparatus; and wherein before the further the operational cycle commences, a new support for supporting the further plurality of warm up layers and build layers is provided to the apparatus. The new support may be at a temperature above the ambient thermal state and below the target steady thermal state, for example by being preheated before being introduced into the apparatus. Alternatively, the support 16 may not be removeable, and the plurality of warm up layers and the plurality of build layers may be removed from the support by transferring them into a transport container.

Non-Layering Stage of the Warm Up Phase

During the layering stage, the layer cycle comprises, before step (b) of distributing the dosed amount, lowering the support 16 by a distance to form a recess within the work surface 8, such that at step (b), a layer portion of the dosed amount fills the recess to form the layer of a thickness defined by the distance; wherein the dosed amount is larger in volume than the layer portion by at least a surplus portion; and pushing the surplus portion into a receiving chamber 44 following the step of distribution of the layer. The warm up phase Wn may comprise a layering stage Wn_LS applying these same steps. Apparatus as shown in FIG. 4 having a recirculation path for dosed powder may also require enhanced warming of the powder recirculation path to bring it to the operational steady state. If the layering cycle were to be applied, this may undesirably increase the number of warm up layers. Instead, an initial 'non-layering stage' may be applied, in which the platform is not lowered before step (b), resulting in pushing the dosed powder across the build area 12 and into the receiving chamber 44, such that the heated dosed powder contributes to heating the recirculation pipes 46, the supply pipe 48 comprising a conveying device such as an auger, and the dosing chamber 40. The warm up phase Wn may therefore further comprise, before initiating the layering cycle of a layering stage Wn_LS, a non-layering stage Wn_NLS comprising the steps of (a), (c) and (d) of the layering cycle, wherein the non-layering stage Wn_NLS does not comprise the step of lowering the platform, or build area, thus forming no recess, and such that step (b) of the non-layering stage Wn_NLS comprises pushing substantially all of the dosed amount over the build area without forming a layer. The layer cycle of the layering stage and the non-layering stage of the warm up phase may further comprise returning the heated dosed amount to the dosing chamber within the apparatus.

Figure 8:
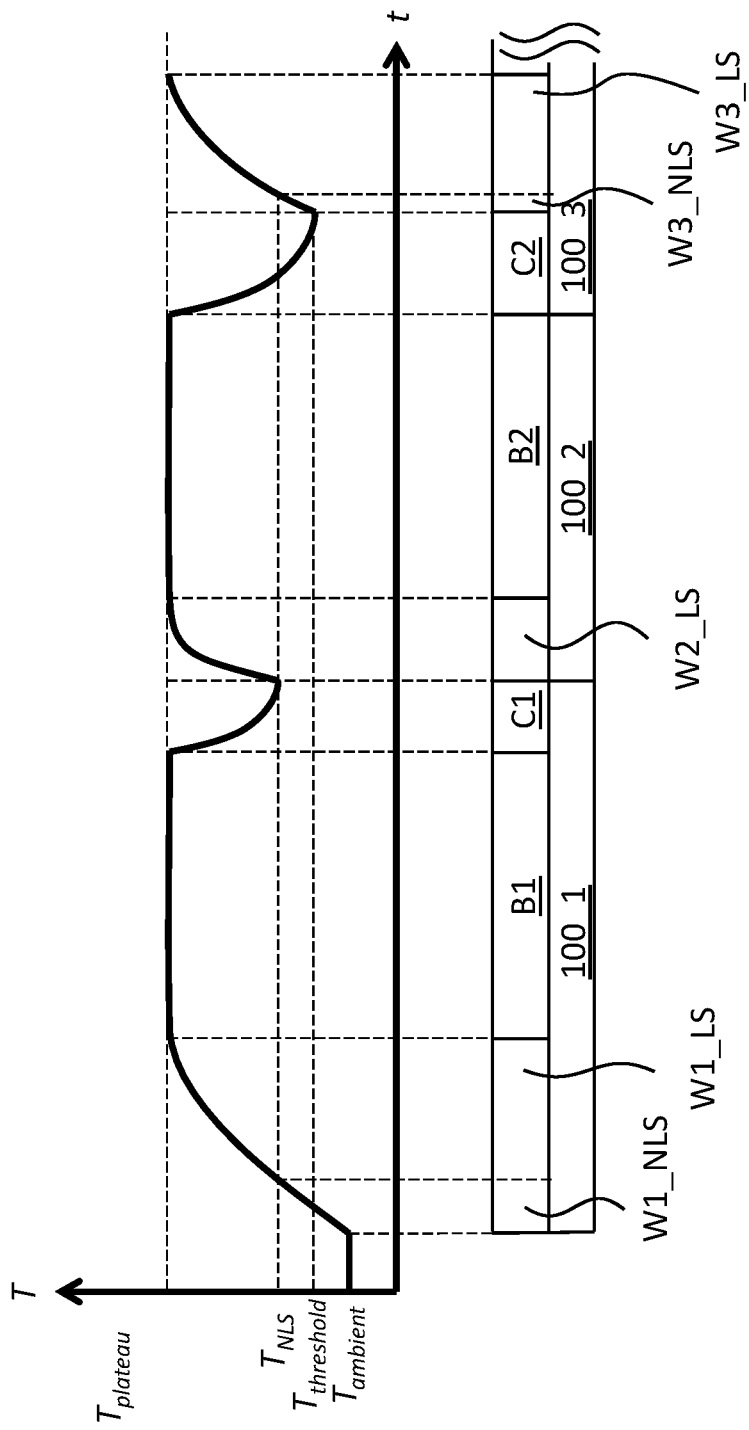
FIG. 8 is a variant of FIG. 2 having a first warm up phase with two stages.

FIG. 8, which is a variant of FIG. 2 and illustrating a warm up phase Wn comprising a non-layering stage Wn_NLS, shows a representative temperature T measured over three operational cycles 100_1, 100_2, 100_3, each having a different warm up phases Wn. The first operational cycle 100_1 starts from ambient thermal state represented by a measured temperature $T_{ambient}$. The first warm up phase W1 is the longest within the number of cycles shown. FIG. 8 also indicates a threshold thermal state $TS_{threshold}$, here represented by a measured temperature $T_{threshold}$, below which the method of operation may be restarted, for example because no significant time saving may be achieved for the next warm up phase, thus exiting the method. A temperature $T_{NLS}$ represents a target non-layering stage thermal state $TS_{NLS}$ up to which the non-layering stage is applied. Once this target is achieved, the warm up phase progresses to its layering stage.

The first warm up phase W1 comprises a non-layering stage, W1_NLS, which comprises applying heat substantially without forming any layers and raising the thermal state. The dosed amount may be heated while being pushed across the build area 12 and into a receiving chamber 44 to be recirculated along the recirculation path back to the dosing chamber 40. The non-layering stage is applied until the predefined target temperature $T_{NLS}$ has been achieved, representing the non-layering target thermal state, $TS_{NLS}$. Once $TS_{NLS}$ is reached, the warm up phase W1 progresses from the non-layering stage W1_NLS to the layering stage, W1_LS1, during which the platform 16 is lowered before each dosed amount is distributed across the build area 12 to fill the formed recess and thus a layer. A surplus portion may be pushed into the receiving chamber 44. For the build phases Bn and cooling phases Cn, the general description of FIG. 2 equally applies. The second operational cycle 100_2 is initiated from a reduced thermal state RTS1 as represented by $T_{NTS}$. This means that the target state $TS_{NLS}$ has already been achieved at the start of the next warm up phase, and no non-layering stage is necessary. As a result, the second warm up phase has a layering stage W2_LS only. The third operational cycle 1003 is initiated from a reduced thermal state RTS2 represented by $T_{threshold}$ which is below the target non-layering thermal state $TS_{NLS}$. The third warm up phase W3 therefore first starts with a non-layering stage W3_NLS that is applied until the non-layering stage target state $TS_{NLS}$ is reached. Since the third warm up phase W3 starts above the ambient state, i.e. $T2>T_{ambient}$, and also from the example threshold thermal state $TS_{threshold}$, a non-layering stage W3_NLS of a shorter duration than that of the first warm up stage W1_NLS is applied, as indicated by the length of the bars for the various stage below and extending along the time axis. If instead the measured temperature falls below $T_{threshold}$, the initial warm up phase W1 may be reapplied to start a new method of operation according to the invention, such that improved throughput may be achieved energy efficiently and cost effectively. In variants, the threshold may be the ambient thermal state itself. Thus, where a non-layering stage Wn_NLS is carried out over a duration of time Δtn, the duration Δtn+1 of a further non layering stage Wn+1_NLS of a further warm up phase Wn+1 of a further operational cycle 100n+1 may be shorter than the duration Δtn of the non layering stage Wn_NLS. The thermal state and the reduced thermal state may be represented by or based on a temperature measured of the build material in the dosing chamber 40. Where the reduced thermal state RTS is at or above a target non-layering thermal state $TS_{NLS}$, the further operational cycle may comprise a warm up phase with only a layering stage. During the non-layering stage Wn_NLS, the step of heating the dosed amount may comprise: heating the build material in the dosing chamber; and/or heating the portion of the dosed amount while pushing the dosed amount over the build area 12, by one or more of: (i) operating the stationary heat source 20 arranged above the build area 12; (ii) operating the or a one or more moveable first and/or second heat sources L1, L2 while passing the one or more moveable heat sources across the build area 12; and (iii) operating a heater arranged below the build area, for example a resistive heat foil attached to and configured to heat the platform 16, so as to heat the build area or platform. Herein, the build area 12 may be described as forming the uppermost surface above the platform 16, and may be the platform surface itself.

By providing a non-layering stage within the warm up phase Wn, the total number of layers formed over the platform during the warm up phase may be reduced or minimised, in turn making available a larger number of layers over which objects may be formed during the build phase and thus increasing the productivity of the apparatus. Additionally, or instead, the non-layering stage may be arranged such as to achieve the target thermal state faster than if a layering phase were to be applied only. In each case the throughput is increased. In the method and its variants presented herein, it should be noted that a determined RTSn+1 may be lower than a preceding RTSn and thus the duration of the next warm up phase may be longer than a duration of the preceding warm up phase, unless additional heating is provided by selecting a 'boosted' non-layering stage Wn+1_NLS for example for the next warm up phase. As long as the reduced thermal state remains above the ambient state, the duration of any of the warm up phases is lower than the duration of the initial warm up phase from ambient.

The step of pushing the dosed amount across the build area 12 may be carried out by the distributor 32 of FIG. 3A, while it is being moved across the build area 12. For at least some of the number of cycles of the non-layering phase Wn_NLS, and optionally for at least some of the layers (e.g. some of the initial layers) of the layering stage Wn_LS of the warm up phase, the moveable components may be moved at a higher speed than during the layering stage of the build process, and during at least some of the layering stage of the warm up phase, by moving and/or returning back to a starting position at the start of the cycle, at a higher speed: the distributor over the build area 12; the first and/or the second heat source over the build area. This reduces, or further reduces the duration of the warm up stage. Optionally, some of all of the various heating elements such as the stationary overhead heater, foil heaters, radiative heat sources may be operated during the non-layering stage similarly as during the layering stage. Optionally, during some or all of the layering stage of the warm up phase Wn, the dosed amount may be larger than the dosed amount of the build phase Bn. Additionally, some or all of the various heating elements, such as the stationary overhead heater, foil heaters, and/or radiative heat sources, may be operated at a different power input, for example a higher power input, during the at least some of the cycles of one or more of the warm up phases Wn.

In variants, the non-layering stage Wn_NLS may not comprise pushing a dosed amount across the build area, but comprises heating the distribution and dosing path, for example by operating foil heaters around any of the pipes and chambers comprising build material, heating the piston 16, and/or operating any or any combination of the radiative heat sources used to heat the build material during the build cycle without the step of dosing and distributing/pushing build material across the build area 12.

Calibration Routines

The layering stage Wn_LS of the warm up phase Wn may be utilised to carry out certain calibration routines to optimise the thermal performance of the various thermal components contributing the heating and thermal control of the system. For example, for one or more calibration layers of the plurality of layers of the warm up phase Wn, the layer cycle of the warm up phase Wn may be a calibration layer cycle that is the same as the layer cycle of the build phase Bn, comprising at step (c): selectively heating a layer-specific region 50 defined within the build area 12 to form a cross section of one or more test objects, for example by depositing absorption modifier such as radiation absorber over the layer specific region 50 such that the step of heating causes at least increased heating, or melting, within the layer specific region 50 compared to the surrounding area. The one or more calibration layers may be formed so as to calibrate one or more of the thermal components; and the calibration layer cycle further comprises at step (d) of measuring, following at least the step (c) of selectively heating a layer-specific region 50: (i) measuring the temperature of the one or more layer specific regions 50; (ii) determining a calibration outcome for the thermal component based on the one or more measured temperatures, and (iii) applying the calibration outcome to a subsequent layer. The step (c) of heating so as to selectively heat the layer specific region 50 may for example comprise: heating by the first heat source L1, optionally operated in fusing mode, and following deposition of absorption modifier, or, where present, the step of heating by the second heat source L2 following deposition of absorption modifier.

Figure 9:
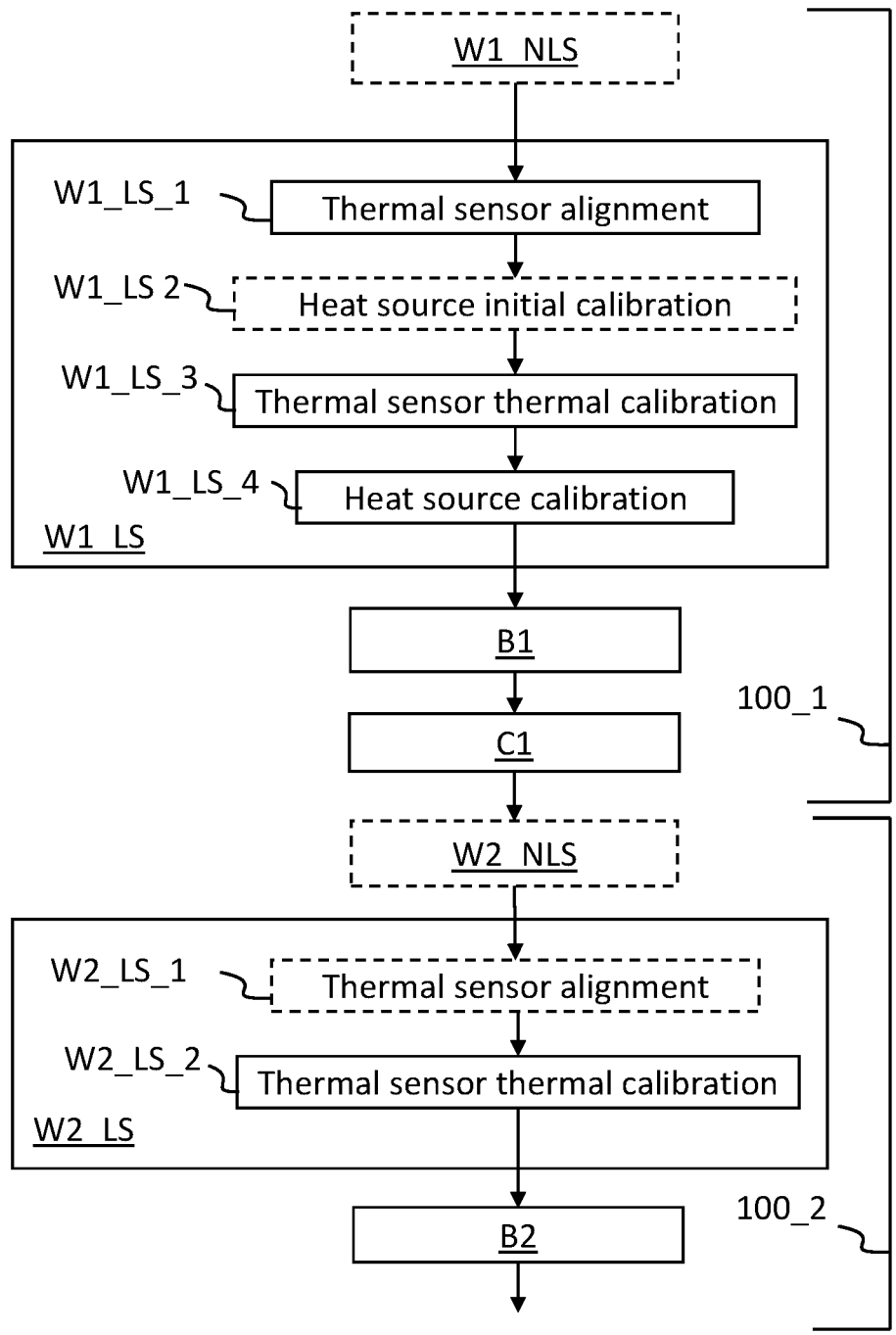
FIG. 9 is a variant of FIG. 1 in which the layering stage of the warm up phase comprises one or more calibration routines of one or more thermal components of the apparatus.

A further warm up phase Wn+1 may comprise fewer layers than a preceding warm up phase Wn, as is described above. The further warm up phase Wn+1 in a further operational cycle 100_$n$ may thus comprise fewer calibration layers than the preceding warm up phase Wn. This may mean that the next build phase may be started sooner, thus increasing the throughput rate for objects of the apparatus. Since the depth of the build volume is typically defined by the maximum distance over which the platform 16 may be lowered, in variants of the method, the fewer warm up layers may be offset against applying more build layers, which also increases the throughput rate. The calibration layer cycle may for example be arranged to calibrate a first thermal component, such as the thermal sensor 72 arranged above the build area 12 to monitor the temperature of the build area; and wherein in a further operational cycle 100$n$+1, the calibration layer cycle for the first thermal component is carried out over fewer layers than the calibration layer cycle for the first thermal component of the preceding operational cycle. Alternatively, or instead, the fewer calibration layers in a further operational cycle 100$n$+1 comprise one or more fewer calibration outcomes compared to the calibration layers of the preceding warm up phase. FIG. 9 is a flow chart illustrating by way of example such a variant, comprising at least two operational cycles 100_1 and 100_2. The first operational cycle 100_1 comprises a warm up phase W1 comprising optionally a non-layering warm up stage W1_NLS and a layering stage W1_LS. The layering stage W1_LS comprises a plurality of calibration layers to calibrate a thermal sensor and a heat source. The thermal sensor may be thermal sensor 72 arranged above the build area 12, and may comprise an array of individually operable sensor pixels. First, a first sub-layering stage W1_LS_1 is applied to form a first set of calibration layers for aligning the image of the array of the thermal sensor 72 to the build area 12. From a number of measurements made of the build area by the thermal sensor, and by for example comparing to a feature of known location and orientation within the image, an alignment correction may be determined that is applied for the subsequent layers of the layering stage W1_LS. Next, optionally, at a second sub-layering stage W1_LS_2, a heat source, such as first heat source L1 moveable across the build area 12, may be calibrated initially with respect to measurements by the thermal sensor 72 and with regard to different power inputs to the first heat source L1. After this, at a third sub-layering stage W1_LS_3, the thermal sensor measurement scale may be calibrated with respect to measurements by the thermal sensor 72 while applying increasing heat to the build area, for example until the build material within a specified area starts to melt. From a characteristic in the evolution of temperature over time for example, the measurement scale of the thermal sensor may be calibrated with respect to the melting point of the build material. The outcome may for example be a set point of the measurement scale that represents the melting point of the build material. The outcome is applied to further layers of the layering stage of the warm up phase. In this example, the heat source, first heat source L1, is calibrated in its performance with respect to the calibrated thermal sensor at a fourth sub-layering stage W1_LS_4. From a series of temperature measurements following heating the build area 12 by the first heat source L1 over the fourth set of a number of layers, an adjusted power input to the first heat source may be determined and applied to further layers. The operational cycle may then progress to the build phase B1, by which time the operational cycle has preferably reached the target steady temperature state, TSTS. The first operational cycle finishes with the cooling phase C1. The reduced thermal state RTS1 of the cooling phase C1 may be represented by for example a temperature T1 as shown in FIG. 8, which in this example is the same as the non-layering stage target temperature $T_{NLS}$ such that, there is no requirement to apply a non-layering stage in the next warm up phase W2. Furthermore, the layering phase W2_LS is shorter than that of the first operational cycle B1, and thus may have fewer layers than the previous layering phase. The layering phase of the second operational cycle may comprise only one or more calibration routines for the thermal sensor, for example repeating the calibration for the set point of the measurement scale of the thermal sensor 72 at block over a sub-layering stage W2_LS_2 as described for third sub-layering stage W1_LS_3 of the first operational cycle. Thus, wherein the thermal sensor 72 is arranged above the build area so as to monitor a temperature of the build area, the fewer calibration layers may comprise a calibration outcome for the thermal sensor and not any of the heat sources. In variants the calibration for the heat source may comprise a calibration of the first heat source and the second heat source, but for example over fewer layers designed as a rapid verification that the calibration outcome obtained over the first operational cycle is still valid. Additionally, or instead, a further calibration routine may be carried out for the stationary heat source. The calibration routines for any of the heat sources may be carried out only intermittently since their calibration outcomes are less likely to change significantly over a specified period of time, or over a specified number of operational cycles. Additionally, or instead, the sub-layering stages may comprise one or more rapid checks carried out over fewer layers compared to a full calibration routine so as to ascertain whether the calibration outcome(s) of the previous operational cycle remain valid. For example, an average calibration outcome from the fewer layers may be determined and having a relatively larger standard deviation due to the reduced amount of data. If the average calibration outcome is within a predetermined range from the previously determined calibration outcome, it may be determined as indicating that the calibration settings have not changed since the last determination and remain valid.

As described above, the number of fewer calibration layers in a further operational cycle may be determined based on the reduced thermal state, and may be further based on a predefined frequency of a need to calibrate one or more of the first, second and third heat sources per number of operational cycles 100$n$, and/or the thermal sensor 72. It will be appreciated that some warm up layering states Wn_LS may comprise no calibration layers at all but are instead used purely to reach the target steady temperature state, TSTS.

Selection and Dynamic Design of Warm Up Phase

To further improve the method and its variants described herein, certain targets and thresholds may be predefined for the thermal state TS to allow determination of the properties of the warm up phase of the next operational cycle 100. The properties may comprise number of layers, duration of the non-layering stage, input power to heat sources, and so on. For example, as described with reference to FIG. 8, $TS_{threshold}$ (or alternatively the ambient state) may be defined that the reduced thermal state RTSn is tested against; and a non-layering stage target state $TS_{NLS}$ may be defined based on which the duration of a non-layering stage Wn-NLS from the reduced thermal state RTSn is determined.

Figure 10:
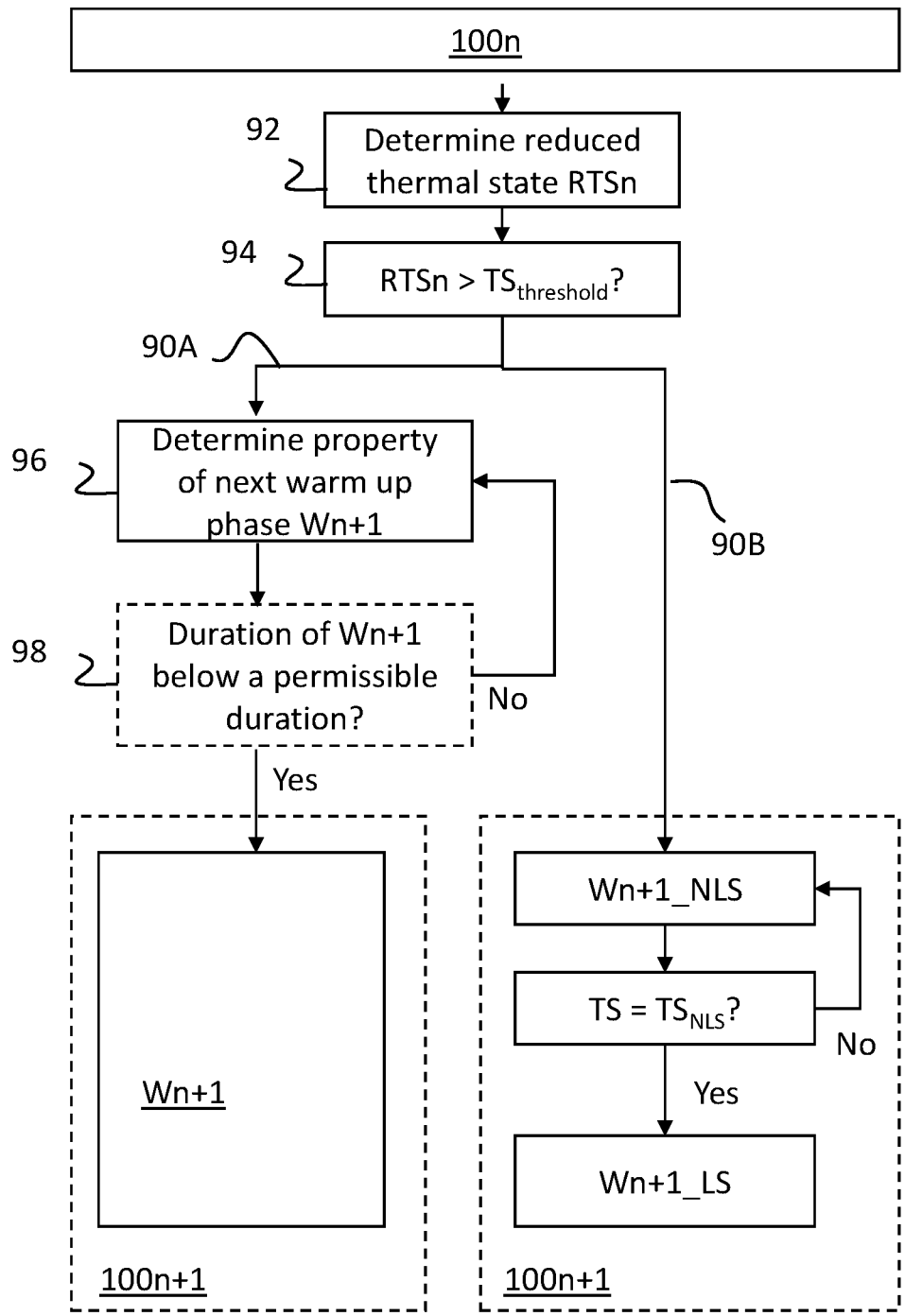
FIG. 10 is a flowchart illustrating options for modifying a further warm up phase.

For example, if the reduced thermal state RTS remains above the ambient state, or above a predefined threshold state above ambient state, for example such that a minimum duration of time (e.g. at least 15 min or at least 30 min) is saved for the next warm up phase compared to the initial warm up phase from the ambient state, the next warm up phase may be chosen purely based on reducing the number of layers. Additionally, or instead, the next warm up phase may be required to fulfil certain predefined conditions. For example, the controller 70 of the apparatus may store information regarding a frequency of certain calibration routines that require to be included periodically within a warm up phase Wn, for example in the warm up phase Wn of every second or more operational cycles. For example, the calibration routine for the first and/or second heat source may only require to be included in the layering stage Wn_LS of a warm up phase Wn every 5 or 10 operational cycles. A variant of the method is illustrated in FIG. 10, which is a flow chart of two operational cycles with two options of how one or more properties of the next warm up phase may be determined. After an operational cycle 100*n*, the reduced thermal state RTSn is determined at block 92. If the determined reduced thermal state RTSn is greater than a predefined threshold thermal state, such as the ambient state or a thermal state above the ambient state, the next warm up phase Wn+1 may be determined as follows. Option 90A comprises determining one or more properties of the next warm up phase before initiating the next warm up phase. For example, based on the determined RTSn, the number of layers of the layering stage of the next warm up phase may be determined. Where RTSn is greater than the threshold, the number of layers may be smaller than an initial number of layers applied when heating from the ambient thermal state. Optionally, at block 98, it may be determined whether the resulting duration of the next warm up phase is shorter than a predefined permissible duration, which may be the duration of the initial warm up phase from the ambient thermal state, or a desired duration of a shortened warm up phase. If the duration is above the permissible duration, the one or more properties of the next warm up phase are modified until the condition is met. Once met, the next warm up phase Wn+1 begins according to the determined properties. For example, the determined properties for a shortened warm up phase may comprise enhanced heating during a non-layering stage Wn+1_NLS and fewer layers formed during the layering stage Wn+1_LS of the next warm up phase. Option 90A illustrates an "active" design path for the next warm up phase. This may comprise actively selecting manually, or by pre-programmed logic, from a finite number of predefined warm up phase types; or dynamically designing the next warm up phase based on predefined boundary conditions such as required number of calibration routines as described below.

A second option 90B is to progress along a "passive" determination of the duration of the next warm up phase. This duration may be estimated based on the known thermal behaviour of the cycle before starting the next warm up phase. In this second option, the next warm up phase is started with a non-layering stage Wn+1_NLS that is applied until the monitored thermal state reaches a predefined target non-layering thermal state $TS_{NLS}$, as was already exemplified in FIG. 8. The time to reach the target non-layering thermal state $TS_{NLS}$ contributes to the duration of the next warm up phase Wn+1 but it is not predetermined. This may be useful in variants in which the threshold thermal state $TS_{threshold}$ is above the ambient thermal state, such that RTSn is used to determine whether the operation of the apparatus proceeds along the improved method and its variants described herein or whether the operation restarts from the initial warm up condition before achieving the enhanced throughput envisaged by the improvements.

A similar decision-making process may be applied to one or more of the further cooling phases. For example, certain maintenance tasks and their estimated duration may be predefined to be comprised within the cooling phase Cn of every second or more operational cycles, and flagged to the user. For example, a replacement of the one or more heat sources, service of droplet deposition heads, refilling of the build material system and so on may need to be carried out during one of the upcoming cooling phases. The cooling phase Cn may comprise certain alerts to the user to time the required tasks so as to remain above the ambient or threshold thermal state. The method of control of the warm up phase disclosed herein may be stopped because the resulting cooling phase is too long to remain above the ambient or threshold state. Alternatively, the method may progress along option 90A as described above to achieve a shortened subsequent warm up phase by suitably adjusting the properties of the next warm up phase Wn+1.

The application of certain calibration routines may be required only periodically, over only some of a number of operational cycles, resulting in a plurality of different warm up phase types that may be selected for the next warm up phase. Similarly, periodic application of certain maintenance tasks results in a plurality of different cooling phase types that may be selected for the next cooling phase and that may affect the resulting reduced thermal state RTS. These types may be pre-programmed and selected based on the predefined conditions and the reduced thermal state RTS. For example, where the reduced thermal state RTSn is determined to be between the predefined threshold thermal state $TS_{threshold}$ and a first elevated thermal state below the operational steady state TSTS, a first type of warm up phase may be applied in the next operational cycle 100*n*+1. Where the reduced thermal state RTSn is between the threshold $TS_{threshold}$ and a second elevated thermal state above the first and below the operational steady state, a second type of warm up phase may be applied in the next operational cycle. Instead of providing a fixed selection of warm up phases, the next warm up phase may be designed dynamically based on an algorithm that is provided to evaluate the reduced thermal state against the predefined boundary conditions and determines the properties of the next warm up phase based on predefined variables such as number of layers and/or input power to the one or more heat source. Further variables that may be comprised in the design of a warm up phase will now be described.

The controller 70, as indicated in FIG. 3A and FIGS. 6 and 7, may be used to carry out part or all of the method and any of its variants described herein; and may be used to determine the one or more subsequent warm up phases based on each determined RTSn.

Further Considerations; Thermal Cycle

In variants, and as described with reference to the apparatus of FIGS. 3A and 3B, the layer cycle 200 of the build phase Bn, and preferably the layer cycle of the warm up phase Wn, may comprise, at step (c), before depositing any absorption modifier, a sub-step (c1) of heating the formed layer by passing the heat source L1 across the build area 12 while operating the heat source L2, so as to preheat the formed layer to a temperature below the melting temperature of the build material and above a solidification temperature of the build material. Following this sub-step of preheating, absorption modifier may be deposited to define a layer-specific region 50. After this, the method may further comprise, at step (c), a sub-step (c2) of heating the build area 12, or at least the layer specific region defined by the absorption modifier, by passing the second heat source L2 across the build area 12 while operating the second heat source L2, so as to heat the layer specific region more than the surrounding area. During the build phase Bn at least, and for some or all of the calibration layers during the layering stage Wn_LS of the warm up phase Wn, the sub-step (c2) is arranged to cause partial or full melting of the build material within the layer specific region 50 so as to form a cross section of the one of more objects, or of the one or more test objects. The layer cycle is further illustrated in FIG. 10, which is a flowchart illustrating the same layer cycle 200 for the layering stage Wn_LS of the warm up phase Wn and the build phase Bn. The layer cycle 200 may start at any of the blocks, and is here illustrated by starting at dosing an amount of build material to the work surface 8 at a block 202. In a step not shown, the build area 12 is lowered by a distance corresponding to the thickness of the layer that is to be formed. This step may happen before, simultaneous with or after dosing the amount at step 202, but before the next step at block 204 of distributing the dosed amount across the build area 12 to form a layer. Following distribution, at block 84, and corresponding to step (c1) described above, the first heat source L1 is passed over the build area so as to preheat the newly formed layer surface. This heats the newly distributed layer to a temperature at or closer to the target layer temperature with respect to which the stationary overhead heater 20 at block 82 may be operated. If one or more objects are to be formed, at subsequent optional block 210, absorption modifier may be deposited so as to define a layer-specific region 50 to represent a cross section of the one or more objects. It should be noted that some layers in the layer cycle 200 may be "blank" layers which do not receive any radiation absorber. These layers may be buffer layers between objects or test objects for example. Next, at block 86, the second heat source is passed over the build area and operated so as to selectively heat the layer-specific region 50 where block 210 is present, or to simply heat a second time the build area 12 following the step of preheating at block 84. At block 214, one or more temperatures of the build area are measured so as to provide temperature feedback for the control of the operation of the stationary heat source 20 at block 82. Block 214 may be applied at one or more of the blocks of the layer cycle 200, and may not be sequential as shown. It may be applied following block 204 of distribution, and/or at block 84 of preheating with the first heat source, and/or of depositing absorption modifier, and/or of heating with the second heat source, for example. The operation of the stationary heat source at block 84 may be controlled based on the target layer temperature and based on one or more of the measured temperatures, which may be an average temperature. The layer cycle 200 is repeated a number of times along repeat loop 224 until the respective plurality of layers has been formed for each phase, as determined at decision point 220.

Figure 11:
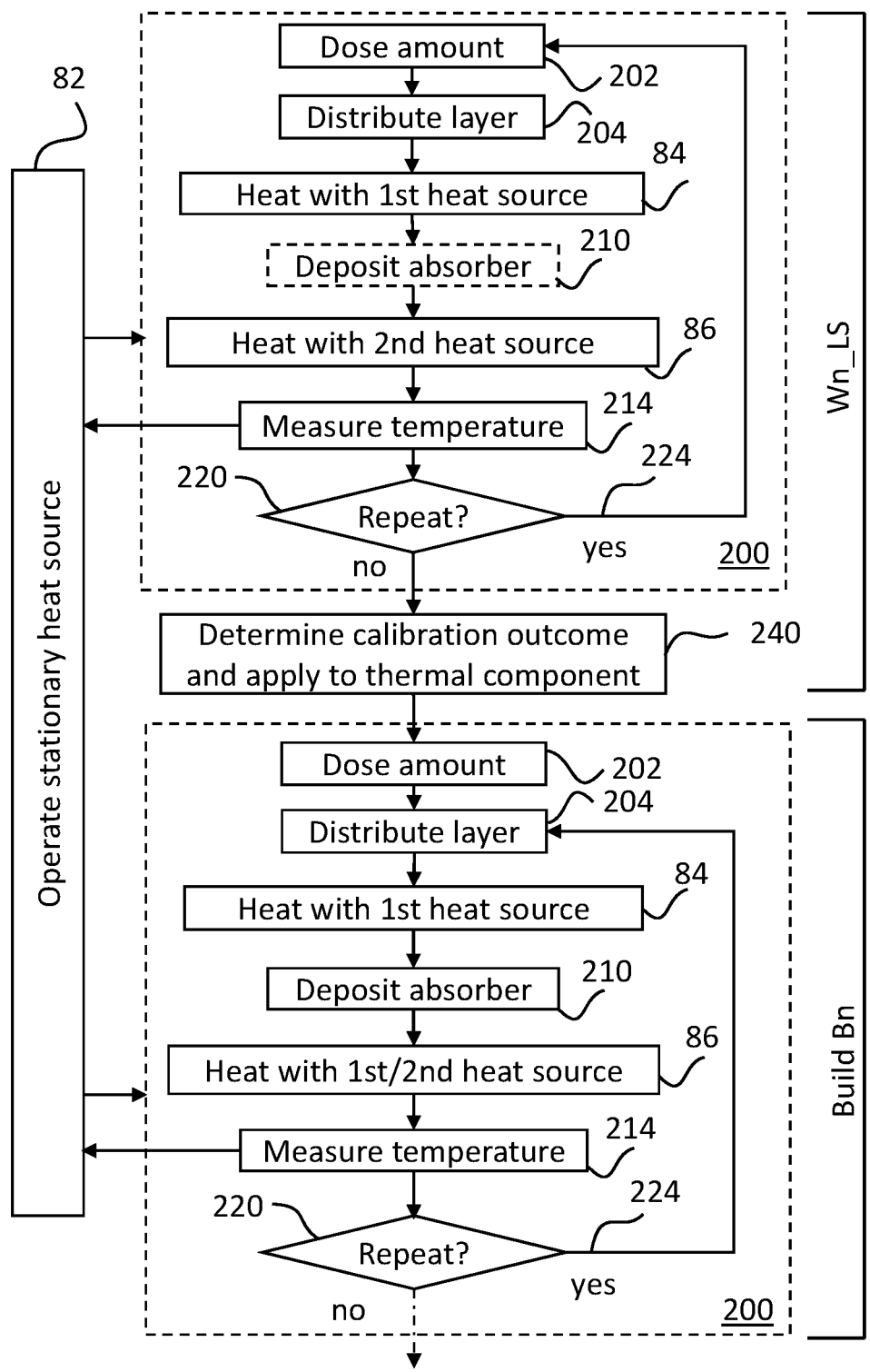
FIG. 11 is a flowchart illustrating a variant of the layer cycle of the warm up and build phase.

The layer cycle 200 of at least some of the final layers of the warm up phase Wn and throughout the build phase is thus preferably the same as indicated by the same reference numerals of the blocks in FIG. 11. The sequence of blocks contributing to the thermal impact of each layer define part of the shape of the thermal cycle of each layer, as defined by the progressive changes in temperature at one or more representative locations of the layer. Preferably the shape of the thermal cycle defined by the layer cycle 200 is substantially the same for the build phase Bn and at least some of the warm up phase Wn. Optionally, the shape may further be defined by the speeds and timings of the motion of the moveable heat sources and the distributor at blocks 204, 84 and 86. In preferred variants, these are preferably identical for at least some of the layers of the warm up phase Wn adjacent the build layers of the build phase Bn. The movement of the carriages 30_1, 30_2 in FIGS. 3A and 3B for example and the action of the various modules over the build area 12 as herein described may describe a dynamic repetitive layer cycle. Preferably, the steps of distributing the dosed amount across the build area 12 and of heating using the moveable heat sources L1, L2 area applied along the same direction and at the same speeds, such that a respective time interval between the thermal events of cooling following distribution of a layer, and of heating the layer by the first and second heat sources are the same at any location over the build area 12. In this way, the same shape of a thermal cycle is maintained throughout at least some, and preferably all, of the layering stage Wn_LS of the warm up phase Wn and throughout the build phase Bn. This may be described by initiating the step at block 204 of distributing a layer across the build area 12 (e.g. by moving the distributor 32 to push the dosed amount across the build area to form a layer); initiating the step at block 84 of preheating the newly formed layer using the moveable heat source L1 after a first time interval from the step of initiating distributing the layer at block 204; initiating a step of heating the formed layer using the second heat source L2 (or the first heat source L1 for a second time, where only one such heat source performs both heating steps by a moveable heat source) after a second time interval from the step of initiating distributing the layer; and initiating the next step of distributing after a third time interval from initiating the step of heating the formed layer at block 86; wherein the first, second and third time intervals are the same for each cycle of at least the final layer stage of the warm up phase and the build phase. The heat sources of the build phase Bn may be operated throughout the warm up phase Wn in this way, and optionally also during some or all of a non-layering stage Wn_NLS of the warm up phase Wn.

The direction of the steps of distributing a layer and of passing the first, or the first and the second, heat source over the build area 12 while heating the build area is preferably the same direction. For example, with reference to the apparatus in FIG. 3A, both carriages may start the layer cycle from a position to the left of the build area 12. After block 202 of dosing an amount of build material to the work surface 8 between the build area 12 and the position of the distributor 32, the first carriage 301 is moved along the direction from left to right (along x) to carry out the steps at blocks 204 of distributing by the distributor 32 and of heating by the first heat source L1. Where the speed of passing the first carriage 30_1 is constant across the build area 12, and since the first heat source travels with the distributor, the first time interval between blocks 204 and 84 is constant at all points of the build area 12. The second carriage 30_2 with the second heat source L2 follows the first carriage after the second time interval from distributing the dosed amount across the build area 12. The second heat source L2 is operated while the second carriage is passed over the build area. Where the speed of the second carriage 302 is the same constant speed as that of the first carriage across the build area, the second time interval is the same for each location on the build area 12. The droplet deposition module 38 may be operated to deposit absorption modifier ahead of the step of heating at block 86 by the second heat source L2. In certain apparatus it may be desirable to control the timing of passing the droplet deposition module also; in the apparatus shown this may be provided by it being mounted to the same carriage as the second heat source L2 and thus is not independently controllable in its timing from the second step of heating at block 86. After both carriages have passed the build area 12, they are returned to the starting position along the opposite direction at a speed that is preferably constant but potentially a higher speed than applied to carry out the steps of distributing and heating. The third interval defined between the step of heating at block 86 by the second heat source L2 (or in variants by the first heat source L1) and of starting the next cycle by distributing a further layer at block 202 is preferably the same for each layer. This means that any cooling time due to the delay of returning the carriages to the starting position before distributing a further layer is the same for all locations across the build area, and the same for each layer.

Thus, the build phase Bn and at least one or more layers of the layering cycle of the warm up phase Wn adjacent the build phase Bn may comprise initiating the sub-step (c3) of heating the formed layer by passing the heat source L2 across the build area 12 while operating the heat source L2 at block 86 after a time interval (above the second time interval) from initiating the step (b) of distributing the dosed amount at block 202; and initiating the step (b) of distributing at block 202 after a further (above the third) time interval from initiating the step (c3) of heating; wherein the time interval and the further time interval are the same for each of the layers cycles for the one or more layers, and the duration of the layer cycle is the same for those one or more layers of the warm up phase adjacent the build phase Bn. Furthermore, the preheat time interval between initiating the step (b) of distributing at block 202 and initiating the step (c1) at block 84 of heating using the first heat source 11 may be the same for each of the layer cycles for the one or more layers, such that the step of heating the newly distributed, colder layer occurs after the same delay from distributing that new layer for each layer. This provides for the same shape of the thermal cycle for the layer cycles of those layers. It has been found that this provides improved consistency in, and control over, the quality of the built objects.

The shape of the thermal cycle may further be affected by the levels of heating and cooling.

During some or all of the warm up phase Wn, one or more of the thermal components applied to heat the dosed amount may be operated differently than during the build phase Bn, thus achieving a different shape of the thermal cycle. This may for example be the case for the non-layering stage Wn_NLS of the warm up phase Wn. This may achieve for example a faster warm up of the build material. When the layering stage Wn_LS commences, some or all of the layers may be formed by applying the layer cycle such that the shape of the thermal cycle is substantially the same as that of the build phase, at least in timings of thermal events of distributing and heating by the radiative heat sources 20, L1, L2. This may be preferable where any of the layers are calibration layers for calibrating the radiative heat sources or the measurement scale of the thermal sensor 72. It has been found that this further provides improved consistency and control over the quality of the built objects.

The heat output and/or radiative wavelength of the one or more heat source(s) L1, L2 may be different during the warm up phase Wn compared to the build phase Bn so as to achieve different levels of heating of the dosed amount during the warm up phase Wn, compared to for example heating the layer or object specific region 50 during the build phase Bn. The piston 16 may be heated so as to heat the build area 12 from below. This will affect the temperature of a number of layers distributed initially during the warm up phase, and will contribute to heating the dosed amount during the non-layering stage Wn_NLS.

In an alternative apparatus to the one shown in FIG. 3A, a single moveable heat source L1 may be used for carrying out the preheating step, returning without being operated/heating along the second direction, and then carrying out a fusing step, or second heating step, again in the first direction. Where the apparatus has two heat separate heat sources for the two steps, for example as shown in FIGS. 3A and 3B, the two carriages may move one after the other, the second carriage 30_2 following the first carriage 301, along the first direction (here along x), and the first heat source L1 is used for the step (c1) of heating at block 84 and the second heat source L2 is used for the sub-step (c3) of heating at block 86. Other carriage arrangements may be envisaged, for example where the first and second carriages 30_1, 30_2 are reversed with respect to FIG. 3A, to implement the method and its variants. In this case, the carriages move in the first direction, the second carriage 30_2 leading the first carriage 30_1, to carry out the heating step at block 86 of the previous layer by the second heat source L2, followed by the distributor module (or "distributor") 32 on the second carriage 30_2 to distribute the new layer at step (b) at block 204, and heating that layer at sub-step (c1) of step (c) using the first (pre)heat source L1. Both carriages then return along the second direction with the heat sources turned off to repeat steps (c3), (b), (c1); i.e. with this arrangement the layer cycle may start at block 86. In further implementations, a single carriage may support the one or more heat sources and the distributor 32 and the deposition unit 38, thus fixing the time interval between the step of heating at block 86 after distributing at block 204 or between the step of distributing at block 202 after heating at block 86, depending on the order of components and the direction of movement, for a given carriage speed.

The stationary heat source 20 as shown in FIG. 3A may comprise an array of individually addressable heater elements configured to provide individual, or zonal, thermal compensation over corresponding locations, or zones, on the build area 12. In variants, and depending on the type of heat source and its mode of operation, it may be preferable to operate the stationary heat source 20 continuously throughout the duration of at least the layering stage WN_LS of the warm up phase Wn and throughout the build phase Bn. In other words, the stationary heat source may be operated throughout each block of the layer cycle 200. Continuous operation may comprise operating each heating element of the stationary heat source 20 at respective constant or variable duty cycles. The thermal sensor 72 arranged above the build area 12 may be a thermal camera with a high-resolution pixel array configured to monitor the build area 12. A plurality of pixels may be arranged such that each of the plurality of pixels measures a temperature for a corresponding one of the plurality of zones of the build area 12. In this way, the stationary heat source may be operated to provide zonal heating, by operating each heater element in response to the measurements of the one or more groups of sensor pixels. The stationary heat source 20 may be operated continuously during the layer cycle 200 in response to temperature measurements by the thermal sensor 72. Continuous operation of any of the heat sources may comprise operating a heat source at a predefined power input over the duration of their operation.

Preferably, the first and second heat sources L1, L2 are operated continuously during their movement over the build area 12, at a constant or varying duty cycle for example. Any or all of the heat sources may be operated in a similar way to that of the layer cycle 10 during a non-layering stage Wn_NLS of the warm up phase Wn. In this case, in absence of a layer surface, the operation of one or more of the heat sources, such as the stationary heat source 20, may be based on temperature measurements of the build material ahead of dosing, for example of the build material within the dosing chamber 40 as described above. Based on the measurements at block 214, feedback control may also be applied to the input power of the first and/or second heat sources L1, L2 as they are passed over the build area at blocks 84 and 86. The input power profile of the one or more moveable heat sources L1, L2 may be a constant input power profile during the step of heating, for example a constant duty cycle, such that the energy of heating is constant along the direction of passing the first and second heat sources over the build area 12 at blocks 84 and 86. In variants of the method, the input power profile of at least one of the heat sources may vary along the direction of movement, i.e. it may vary with distance over the build area 12 during the step of heating. Additionally, or instead, the power input may be varied in response to the measured temperature of one of the sensors 72, 74, 76 over different cycles of the warm up phase Wn. In variants, the power input to the moveable heat sources L1, L2 may be different during the non-layering phase Wn_NLS compared to the layering phase Wn_LS of the warm up phase Wn. This may result in different heating conditions during all of part of one warm up phase to the next. With reference to FIG. 1, heating conditions HW1 during a first warm up phase W1 of an operational cycle may be different to heating conditions HW2 during a subsequent, e.g. second, warm up phase W2 of a subsequent, second operational cycle. In some variants the heating conditions may also differ between different build phases Bn, such that HB1 is not the same as HB2, however preferably the heating conditions are the same throughout the number of operational cycles 100n of the method.

The controller 70 may be arranged to control or optimise the design of a warm up phase Wn+1, as described with reference to FIG. 10 above, based on a preferred duration of the further warm up phase, the reduced thermals state RTSn of the preceding cooling phase Cn, the target layer temperature T(target) to be achieved and/or a corresponding temperature measured elsewhere along the build material path, such as the plateau temperature. Furthermore, a non-layering stage target temperature $T_{NLS}$ may be defined for the non-layering phase. In variants, a range for the non-layering stage target temperature $T_{NLS}$ may be defined. For example, the target temperature $T_{NLS}$ may be chosen from a range so as to reduce the number of layers of the layering stage. Additionally, or instead, the duration to achieve the non-layering stage target temperature $T_{NLS}$ may be defined and the controller may be arranged to determine the heating conditions during the non-layering stage so as to achieve the non-layering stage target temperature $T_{NLS}$ within the defined duration, based on one or more boundary conditions so as to prevent applying excessive heating that would deteriorate the quality of the build material. This may lead to a minimised warm up phase duration. Thus the controller may be configured to determine one or more properties of the warm up phase based on a predefined duration over which the warm up phase is to applied to achieve steady thermal state, for example as indicated by the plateau temperature $T_{plateau}$, wherein the one or more properties may comprise one or more of: a duration of a non-layering stage versus a duration of a layering stage; one or more calibration layers for one or more calibration routines of a thermal component during the layering stage of the warm up phase; the speed at which one or more of the one or more moveable heat sources L1, L2 and the distributor 32 are passed and/or returned over the build area at any of the cycles of the warm up phase; a non-layering stage target temperature $T_{NLS}$ of the non-layering phase; and a duty cycle of the one or more radiative heat sources 20, L1, L2. Optionally, the controller may be configured to determine a different thermal cycle to be applied during a first duration of the warm up phase, and determine a second duration applied over at least part of the layering stage of the warm up phase, and over which warm up layers are processed according to the thermal cycle of the subsequent build phase. Optionally, the shape of the thermal cycle over the second duration may be substantially the same as that of the subsequent build phase. The controller may further be configured to monitor a temperature of the build material path and determine, from the monitored temperature, that the non-layering stage target temperature $T_{NLS}$ of the non-layering phase has been achieved and initiate the layering stage of the warm up phase; and/or, from the monitored temperature, that the plateau temperature $T_{plateau}$ has been achieved and initiate the build phase based on the determination. This may comprise initiating one or more final warm up layers to be processed before progressing to the build phase.

We claim:

1. A method of operation for an apparatus for the layer-wise manufacture of 3D objects from particulate build material, wherein the apparatus includes a build area within a work surface and one or more heat sources configured to heat particulate build material; the method comprising two or more operational cycles of a warm up phase, the first operational cycle starting from an ambient thermal state, followed by a build phase to manufacture one or more objects, followed by a cooling phase, wherein the cooling phase includes removing a plurality of warm up layers and build layers from the apparatus;

wherein the warm up phase and the build phase each further comprise a layer cycle of:
(a) dosing an amount of build material to the work surface;
(b) distributing at least a layer portion of the dosed amount over the support or build area so as to form a layer, each layer surface forming a new build area;
(c) heating, at one or both of steps (a) and (b), the dosed amount by a first heat source;
(d) monitoring at one or more of steps (a) to (c) a temperature of the build material so as to determine a thermal state;

wherein the build phase further comprises at step (c) a step of selectively melting a layer-specific region defined within the build area to form a cross section of the one of more objects using the first heat source or a fusing heat source, and wherein the steps (a) to (d) are repeated to form a plurality of layers each until the warm up phase and the build phase are complete;

wherein the operational cycle comprises:
achieving over the plurality of warm up layers a target steady thermal state as determined from the measured thermal state;
maintaining the target steady thermal state over the plurality of build layers;
exiting the target steady thermal state to commence the cooling phase over which a reduced thermal state is achieved, wherein the reduced thermal state is above the ambient thermal state; and determining a property of the further warm up phase of the further operational cycle based on the reduced thermal state of the preceding cooling phase, such that a duration of the further warm up phase is shorter than a duration of the warm up phase of a preceding operational cycle.

2. The method of claim 1, wherein the property of the further warm up phase is the number of layers of the further warm up phase, the further warm up phase comprising fewer layers compared to the preceding warm up phase.

3. The method of claim 2, further wherein the number of layers of the further build phase of the further operational cycle is based on the fewer number of layers of the further warm up phase, such that the further build phase comprises more layers than the preceding build phase.

4. The method of claim 1, wherein the thermal state is represented by or based on or more of a temperature of a build material path of the build material, the build material path comprising the build area and the build material in a dosing chamber of the apparatus, wherein the step of dosing the amount of build material comprises dosing the amount of build material from the dosing chamber to the work surface.

5. The method of claim 1, wherein the apparatus has a plurality of thermal components including: a thermal sensor for carrying out step (d) of monitoring the thermal state of the build material; the first heat source, or the first and fusing heat source and a stationary heat source arranged above the build area, wherein each heat source is configured to carry out the step (c) of heating the dosed amount; wherein step (c) of the layer cycle further comprises at least two of:
(c1) heating the build area with the stationary heat source by operating the stationary heat source in response to the thermal state monitored at step (d);
(c2) following the step (b) of distributing at least a layer portion of the dosed amount over the build area: heating the build area by passing while operating the first heat source over the build area; and
(c3) following the step (c2), and, where present the step of depositing absorption modifier: heating the build area by passing while operating the first heat source and/or the fusing heat source over the build area, so as to cause the build material within the layer-specific region to melt.

6. The method of claim 1, wherein the layer cycle of the warm up phase comprises the steps of the layer cycle of the build phase, and wherein the layer cycle for one or more layers of the warm up phase is a calibration layer cycle for one or more calibration layers for calibrating one or more thermal components comprised within the apparatus; wherein, after at least the step of heating by the first heat source, and/or the step of heating by the fusing heat source, the calibration layer cycle comprises at step (d): (i) measuring the temperature of the one or more layer specific regions; (ii) determining a calibration outcome for the thermal component based on the one or more measured temperatures, and (iii) applying the calibration outcome to the thermal component for a subsequent layer.

7. The method of claim 6, wherein the property of the further warm up phase in the further operational cycle is the number of calibration layers, and wherein the step of determining comprises determining fewer calibration layers than the preceding warm up phase, optionally wherein: the fewer calibration layers in the further operational cycle comprise one or more fewer calibration outcomes compared to the calibration layers of the preceding warm up phase, and/or wherein the fewer calibration layers in the further operational cycle comprise one or more fewer calibration outcomes compared to the calibration layers of the preceding warm up phase.

8. The method of claim 7, wherein the calibration layer cycle is arranged to calibrate a first thermal component, and wherein in a further operational cycle, the calibration layer cycle for the first thermal component is carried out over fewer layers than the calibration layer cycle for the first thermal component of the preceding operational cycle.

9. The method of claim 1, wherein the layer cycle comprises, before step (b) of distributing the dosed amount, lowering the build area by a distance to form a recess within the work surface, such that at step (b), the layer portion of the dosed amount fills the recess to form the layer of a thickness defined by the distance; wherein the dosed amount is larger in volume than the layer portion by at least a surplus portion; and pushing the surplus portion into a receiving chamber following the step of distribution of the layer.

10. The method of claim 9, wherein the warm up phase further comprises, before initiating the layer cycle of a layering stage, a non-layering stage comprising the steps of (a), (c) and (d) of the layering cycle, and wherein the non-layering stage does not comprise the step of lowering the support, thus forming no recess and such that step (b) of the non-layering stage comprises pushing substantially all of the dosed amount over the build area without forming a layer.

11. The method of claim 10, wherein the thermal state is represented by or based on or more of a temperature of a build material path of the build material, the build material path comprising the build area and the build material in a dosing chamber of the apparatus, wherein the step of dosing the amount of build material comprises dosing the amount of build material from the dosing chamber to the work surface, and wherein: the non-layering stage further comprises pushing substantially all of the dosed amount into a dosing chamber; and the layer cycle of the layering stage and the non-layering stage of the warm up phase comprises returning the heated dosed amount to the dosing chamber within the apparatus.

12. The method of claim 10, wherein during the non-layering stage, the step of heating the dosed amount comprises one or both of: heating the build material before the step (a) of dosing; and, heating the portion of the dosed amount while pushing the dosed amount over the build area by one or more of (i) operating a stationary heat source arranged above the build area; (ii) passing, while operating, the first and/or fusing heat source across the build area; and (iii) operating a heater arranged below the build area so as to heat the build area.

13. The method of claim 10, wherein a property of the warm up phase comprises a duration of time over which the non-layering stage is carried out, and wherein the step of determining comprises determining, based on the determined reduced thermal state, the duration of the further non layering stage of the further warm up phase of the further operational cycle such that the duration of the further non layering stage is shorter than the duration of the preceding non-layering stage.

14. The method of claim 10, wherein a property of the warm up phase is the duration of the warm up phase, and wherein the method further comprises at least one of: determining, based on the determined reduced thermal state and a target non-layering thermal state, a duration of the non-layering stage of the further warm up phase; and during the non-layering stage of the further warm up phase, determining, based on the monitored thermal state at step (d), that a target non-layering thermal state has been reached; and, initiating the layer cycle of the warm up phase, so as to enter the layer cycle of the warm up phase without delay;

such that the duration of the further warm up phase is shorter than the duration of the warm up phase of a preceding operational cycle.

15. The method of claim 1, wherein build material is dosed from a dosing chamber at step (a), and wherein the thermal state and the reduced thermal state is represented by or based on a temperature measured of the build material in the dosing chamber.

16. The method of claim 1, wherein the step (b) is carried out by moving a distributor across the build area, and wherein the step (c) of heating the dosed amount is carried out by passing the first and/or the fusing heat source over the build area; and wherein the property of the further warm up phase comprises at least one of:

the speed of passing and/or returning the distributor over the build area;

the speed of passing and/or returning and/or a duty cycle of operating the first heat source over the build area;

the speed of passing and/or returning and/or a duty cycle of operating the fusing heat source over the build area;

wherein the step of determining comprises determining for at least some of the number of cycles of the further warm up phase at least one of a higher speed for the distributor, a higher speed and/or a higher duty cycle for the first heat source and a higher speed and/or a higher duty cycle for the fusing heat source compared to the preceding warm up phase.

17. The method of claim 16, wherein a direction of the steps of distributing a layer and of passing the first, or the first and the fusing, heat source over the build area while heating the build area is the same direction, and wherein the layer cycle of the build phase and of at least one or more layers of the warm up phase comprises: initiating the step (c) of heating by the first or fusing heat source after a time interval from initiating the step (b) of distributing the dosed amount; and initiating the step (b) of distributing after a further time interval from initiating the step (c) of heating by the first or fusing heat source;

wherein the time interval and further time interval is each a constant throughout the build phase and for the at least part of the warm up phase.

18. The method of claim 1, wherein the build phase for two or more operational cycles is the same so as to form the same plurality of objects.

19. The method of claim 1, wherein the target steady thermal state is substantially the same for each operational cycle.

20. The method of claim 1, wherein the property of the further warm up phase is a duty cycle of at least one of the one or more heat sources, and wherein based on the reduced thermal state, the step of determining comprises for at least some of the cycles of the further warm up phase, a higher duty cycle compared to the previous warm up phase.

* * * * *